US010244416B2

(12) United States Patent
Navasivasakthivelsamy et al.

(10) Patent No.: US 10,244,416 B2
(45) Date of Patent: *Mar. 26, 2019

(54) DETECTING DEVICE PRESENCE FOR A LAYER 3 CONNECTION USING LAYER 2 DISCOVERY INFORMATION

(71) Applicant: Microsoft Technology Licensing, LLC, Redmond, WA (US)

(72) Inventors: Arunkumar Navasivasakthivelsamy, Redmond, WA (US); Mitesh K. Desai, Sammamish, WA (US); Dattatraya B. Rajpure, Redmond, WA (US); Henrique M. A. Filgueiras, Kirkland, WA (US); Mukund Sankaranarayan, Sammamish, WA (US); Abhinav Gupta, Bellevue, WA (US); Arvind M. Murching, Redmond, WA (US); Manoj Kumar Miryala, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,613

(22) Filed: Jun. 14, 2017

(65) Prior Publication Data

US 2018/0132120 A1 May 10, 2018

Related U.S. Application Data

(63) Continuation of application No. 15/367,857, filed on Dec. 2, 2016, now Pat. No. 9,693,252, which is a (Continued)

(51) Int. Cl.
*H04W 8/00* (2009.01)
*H04L 12/24* (2006.01)
(Continued)

(52) U.S. Cl.
CPC ......... *H04W 24/08* (2013.01); *H04L 12/2809* (2013.01); *H04L 41/22* (2013.01);
(Continued)

(58) Field of Classification Search
USPC .......................................... 709/203, 224, 227
See application file for complete search history.

(56) References Cited

U.S. PATENT DOCUMENTS 6,912,223 B1 6/2005 Sloane
6,987,847 B1 1/2006 Murphy et al.
(Continued)

FOREIGN PATENT DOCUMENTS

EP 2009940 A1 12/2008

OTHER PUBLICATIONS

"Non Final Office Action Issued in U.S. Appl. No. 13/230,682", dated May 9, 2013, 9 Pages
(Continued)

*Primary Examiner* — El Hadji M Sall

(57) ABSTRACT

Techniques for monitoring presence of a remote device at Layer 2 that allow reducing power consumption without compromising the device's availability. A device that pairs with a remote wireless device may establish a Layer 3 connection, such as an IP connection, to the remote device to provide services to a user. The Layer 3 connection may be formed over a Layer 2 connection via an access point or as a peer-to-peer wireless connection between the devices. When the Layer 3 connection is not actively used to access the remote device, the Layer 3 connection and the supporting Layer 2 connection (e.g., WI-FI, WI-FI DIRECT™ or BLUETOOTH®) may be terminated and presence of the remote device may be monitored using a Layer 2 device
(Continued)

discovery mechanism. The Layer 2 and Layer 3 connections to the device may be reestablished when use of the remote device is desired.

20 Claims, 15 Drawing Sheets

Related U.S. Application Data continuation of application No. 14/968,915, filed on Dec. 15, 2015, now Pat. No. 9,668,153, which is a continuation of application No. 14/139,644, filed on Dec. 23, 2013, now Pat. No. 9,232,422, which is a continuation of application No. 13/230,682, filed on Sep. 12, 2011, now Pat. No. 8,656,015.

(51) Int. Cl.
    *H04L 12/28* (2006.01)
    *H04W 24/08* (2009.01)
    *H04W 52/02* (2009.01)
    *H04W 76/25* (2018.01)

(52) U.S. Cl.
    CPC ....... *H04W 8/005* (2013.01); *H04W 52/0212* (2013.01); *H04W 52/0229* (2013.01); *H04W 76/25* (2018.02); *Y02D 70/00* (2018.01); *Y02D 70/142* (2018.01); *Y02D 70/144* (2018.01); *Y02D 70/22* (2018.01)

(56) References Cited

U.S. PATENT DOCUMENTS

| | | | |
|---|---|---|---|
| 7,031,288 | B2 | 4/2006 | Ogier |
| 7,583,643 | B2 | 9/2009 | Smith et al. |
| 7,751,414 | B2 | 7/2010 | Lee et al. |
| 7,853,663 | B2 | 12/2010 | Hoerl et al. |
| 8,584,209 | B1 | 11/2013 | Borapura et al. |
| 8,656,015 | B2 | 2/2014 | Navasivasakthivelsamy et al. |
| 2001/0036255 | A1 | 11/2001 | Reformato et al. |
| 2004/0103204 | A1 | 5/2004 | Yegin |
| 2004/0162819 | A1* | 8/2004 | Omae .................... H04L 47/10 |
| 2005/0144318 | A1 | 6/2005 | Chang |
| 2006/0075269 | A1 | 4/2006 | Liong et al. |
| 2006/0187858 | A1* | 8/2006 | Kenichi .............. H04L 12/5692 |
| | | | 370/254 |
| 2007/0264991 | A1 | 11/2007 | Jones et al. |
| 2008/0031208 | A1 | 2/2008 | Abhishek et al. |
| 2008/0310332 | A1 | 12/2008 | Hansen et al. |
| 2009/0239469 | A1 | 9/2009 | Rangarajan et al. |
| 2009/0240794 | A1 | 9/2009 | Liu et al. |
| 2010/0246502 | A1 | 9/2010 | Gong et al. |
| 2010/0322213 | A1 | 12/2010 | Liu et al. |
| 2011/0103255 | A1 | 5/2011 | Ikeda et al. |
| 2011/0153818 | A1 | 6/2011 | Vandwalle et al. |
| 2011/0154084 | A1 | 6/2011 | Vandwalle et al. |
| 2011/0161697 | A1 | 6/2011 | Qi et al. |
| 2011/0167469 | A1 | 7/2011 | Letca et al. |
| 2011/0216748 | A1 | 9/2011 | Kawase |
| 2012/0036271 | A1 | 2/2012 | Patil et al. |
| 2013/0067065 | A1 | 3/2013 | Navasivasakthivelsamy et al. |
| 2013/0067068 | A1 | 3/2013 | Hassan et al. |

OTHER PUBLICATIONS

"Notice of Allowance Issued in U.S. Appl. No. 13/230,682", dated Oct. 8, 2013, 7 Pages.
"Non Final Office Action Issued in U.S. Appl. No. 14/139,644", dated Jul. 8, 2015, 6 Pages.
"Notice of Allowance Issued in U.S. Appl. No. 14/139,644", dated Aug. 28, 2015, 5 Pages.
"Notice of Allowance Issued in U.S. Appl. No. 14/968,915", dated Sep. 12, 2016, 8 Pages.
"Notice of Allowance Issued in U.S. Appl. No. 14/968,915", dated Oct. 11, 2016, 8 Pages.
"Notice of Allowance Issued in U.S. Appl. No. 15/367,857", dated Feb. 28, 2017, 9 Pages.
Castignani, et al., "Analysis and Evaluation of WiFi Scanning Strategies", In Proceedings of the 4th Conference on Electrical Engineering, Jan. 22, 2010, 4 Pages.
Kalofonos, et al., "A Network Connectivity Power-Saving Mechanism for Mobile Devices in DLNA Home Networks", In Proceedings of the 4th IEEE Consumer Communications and Networking Conference, Jan. 2007, 5 Pages.
Kim, et al., "Improving Energy Efficiency of Wi-Fi Sensing on Smartphones", In Proceedings of the IEEE on INFOCOM, Apr. 10, 2011, 9 Pages.

* cited by examiner

DETECTING DEVICE PRESENCE FOR A LAYER 3 CONNECTION USING LAYER 2 DISCOVERY INFORMATION

RELATED APPLICATIONS

This application is a continuation of pending continuation application Ser. No. 15/367,857, filed Dec. 2, 2016, which is now allowed, which was a continuation of application Ser. No. 14/968,915, filed Dec. 15, 2015, and now patented, and which was a continuation of application Ser. No. 14/139,644, filed Dec. 23, 2013, and now patented, which was a continuation of application Ser. No. 13/230,682, filed Sep. 12, 2011 and now patented. The aforementioned applications are incorporated herein in their originally filed form.

BACKGROUND

Many computers today have radios to support wireless communication. Wireless communication is used, for example, to connect to an access point of a network. By associating with the access point, a wireless computer can access devices on the network or on other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called WI-FI. This standard was promulgated by the WI-FI Alliance, and is widely used in portable computers. There are multiple versions of this standard, but any of them can be used to support connections through access points.

Wireless communications may also be used to form connections directly to other devices without using an access point. These connections are sometimes called "peer-to-peer" (P2P) connections and may be used, for example, to allow a computer to connect to a mouse or keyboard wirelessly. More generally, peer-to-peer connections may be used to establish a group of devices of any type that may communicate without requiring an infrastructure. Wireless communications for these direct connections also have been standardized. A common standard for low data rate wireless communications is called BLUETOOTH®.

In some instances, a wireless computer may concurrently connect to other devices through an access point and as part of a group engaging in peer-to-peer communications. More recently a standard has been proposed, called WI-FI DIRECT™, that enables both an infrastructure connection and communication as part of a peer-to-peer group with similar wireless communications. This standard, also published by the WI-FI Alliance, extends the popular WI-FI communications standard for infrastructure-based communications to support direct connections. The standard to implement WI-FI DIRECT™ may be referred to as P2P Specifications.

WI-FI and WI-FI DIRECT™ are examples of link layer protocols in accordance with the OSI layered model of network connectivity. This layered model defines the different levels at which connectivity is established between computing devices that are to communicate over a network, with each layer relying on communication being established at the lower layers. Accordingly, each layer has a protocol defining how communication can occur at that layer.

In this layered model, the lowest layer is the physical layer. In wireless communication, radios that transmit and receive signals that carry network communications make up the physical layer. Those radios operate according to a protocol so that information transmitted by one radio may be correctly received by another. The highest layer is the application layer. On the computing devices that are to be connected, applications are the sources and/or destinations of information communicated over the network, and those applications communicate according to an application layer protocol so that information sent by one application can be interpreted by another application that receives it.

Other intermediate layers have other protocols. Two such layers are Layer 2, the data link layer, and Layer 3, the network layer. At the data link layer, a protocol allows information to pass along a link between any two devices. Peer-to-peer protocols, such as WI-FI DIRECT™ and BLUETOOTH® are Layer 2 protocols.

A Layer 3 protocol allows devices that are interconnected through a network, or possibly multiple intervening devices, to communicate. A common Layer 3 protocol is the IP protocol. Under this protocol, devices are assigned IP addresses that allow devices on the network to process packets of information addressed with the IP address of a destination device such that the packet is routed to the device.

Protocols operating at Layer 2 and Layer 3 may include discovery mechanisms. For example, for a first computing device to form a peer-to-peer connection with a second computing device, the first computing device may first "discover" the second computing device. A Layer 2 protocol may specify communications one device can send, and responses other devices may make to those communications, to allow the devices to determine that they are close together and both configured to form a Layer 2 connection. A similar discovery mechanism may exist for devices that may connect over a Layer 3 protocol. Though, rather than engage in short range communications, the discovery protocol may allow one device to discover another device at any location reachable through Layer 3 communications.

Once the devices determine each other's presence at the discovery phase, they may "pair" by exchanging information. During pairing, the devices may exchange information about their capabilities. For example, when a personal computer pairs with a printer, the computer obtains information on the printer and its capabilities, and drivers for controlling the printer are installed on the computer. In addition, the information exchanged during pairing may allow the devices to reconnect at a later time without repeating the discovery protocol.

In some instances, a computing device may monitor for other devices, with which it has already paired, to determine whether the devices are connected to the network. The presence monitoring allows a device to maintain connections to other available remote devices so that a remote device can be accessed without a delay when its use is desired. For example, once a personal computer has paired with a printer at Layer 3, the computer may reestablish a Layer 3 connection to the printer at any time the printer is connected to the Layer 3 network. In this way, the computer can stream a document using the Layer 3 connection immediately in response to a user command to print the document, without requiring a further re-discovery and pairing.

SUMMARY

The following summary is included only to introduce some concepts discussed in the Detailed Description below. This summary is not comprehensive and is not intended to delineate the scope of the claimed subject matter, which is set forth by the claims presented at the end. To save power without degrading the availability of network services, techniques are provided for monitoring presence of other wireless devices that may provide services over a Layer 3 network connection, without maintaining a continuous connection to those devices at Layer 3 and Layer 2. By avoiding the need to maintain an active connection at Layer 3, transmissions and receptions that occur in accordance with the Layer 3 protocol in order to maintain an active connection are avoided. Accordingly, in some embodiments, the techniques may be used in a portable computing device equipped for wireless communication to access services over a Layer 3 network in a low power way that extends operating time of the computing device between charging a battery of the device.

Device presence may instead be monitored using device discovery functionality provided by another protocol layer, other than the Layer 3 protocol. In some embodiments, that discovery functionality may be provided by a Layer 2 protocol.

The wireless device may use the discovery information at Layer 2 in any of multiple ways. Layer 2 discovery information may be used, for example, to indicate to a user of the computing device the availability of another wireless device to provide a service over a Layer 3 network. In some embodiments, those services may entail streaming data, such as to a printer or a television, which may be performed efficiently using a Layer 3 protocol. When a user of a device indicates a desire to access a service provided over a Layer 3 connection by another device to which the Layer 3 connection has been terminated, that Layer 3 connection and the underlying Layer 2 may be reestablished.

Device discovery in accordance with a Layer 2 protocol may be carried out using a Layer 2 discovery mechanism provided by a WI-FI DIRECT™, BLUETOOTH® or any other suitable protocol. Accordingly, in scenarios where a Layer 3 connection to a device was established via an access point of a network, a connection through the access point may be terminated and presence of the device may be monitored via a direct connection to the device at Layer 2.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
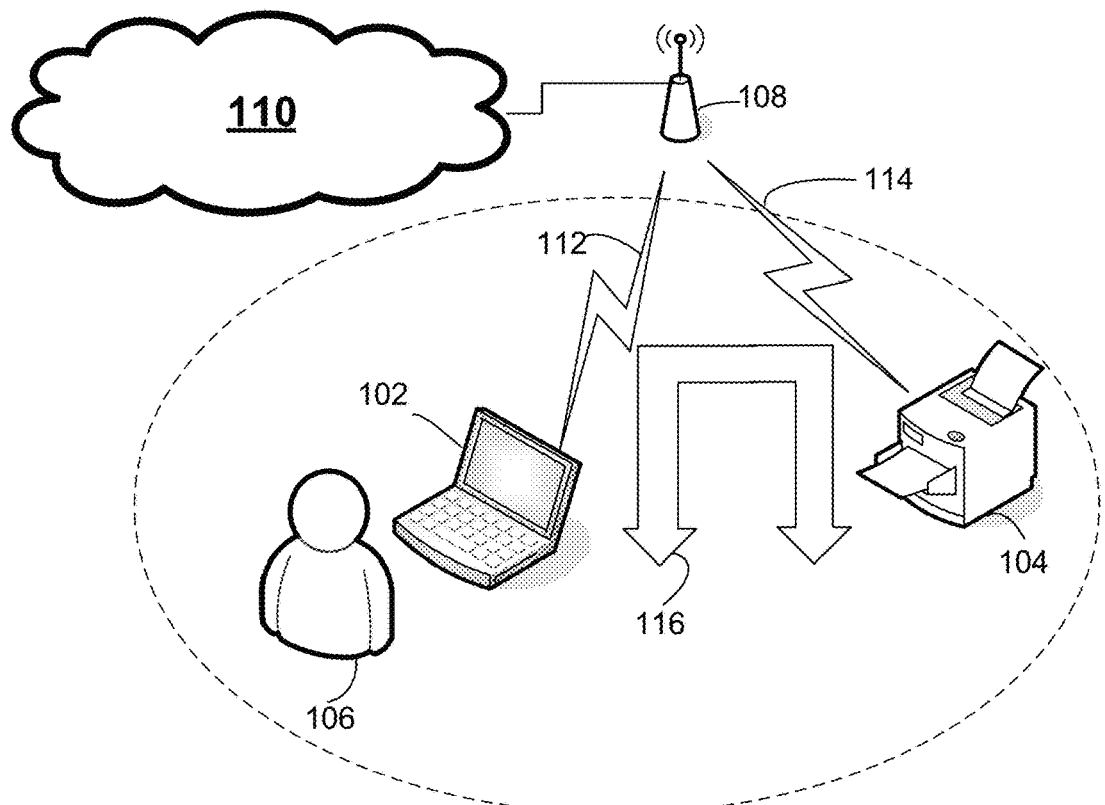
FIG. 1A is a sketch of an illustrative scenario in which a wireless connection at Layer 3 is established between devices that have paired.

The inventors have recognized and appreciated that experience of a user employing a device that obtains Layer 3 network services from other remote devices may be improved by monitoring presence of the remote devices without maintaining a Layer 3 connection. For example, a personal computer or other computing device may monitor presence of a wireless printer or other remote device. After a connection, such as an IP connection, to a remote device at Layer 3 is established, subsequent monitoring of presence of the remote device, while the Layer 3 service from the remote device is not used, may be performed using a Layer 2 device discovery mechanism. The monitoring may be conducted in a manner that allows reestablishing the IP connection to the remote device, based on the monitoring, when it is desired to access functionality provided by the remote device.

Initially, a device may connect to one or more remote devices using conventional Layer 3 connection techniques. For example, it is known that for a device to engage in wireless communication with another device to provide services to a user, the devices may first discover each other. Once the devices have paired, which involves exchanging information about each other's capabilities that is subsequently used for communication between the devices, a connection at Layer 3 may be established between the devices. Conventional device discovery techniques operate at Layer 3. For example, device discovery may be performed in accordance with an IP-based service discovery protocol, such as, for example, Simple Service Discovery Protocol (SSDP), Bonjour and Web Service (WS) Discovery.

One example of a Layer 3 connection that may be established between the devices following their pairing is an IP connection. Such a connection uses the Layer 3 Internet Protocol (IP). Though, it should be appreciated that the connection at Layer 3 may be established in accordance with any other suitable communication protocol, either now known or later developed in the future, as embodiments of the invention are not limited in this respect.

The IP connection may be established between a pair of devices through an access point, by associating each of the devices with the access point using a WI-FI protocol. Further, depending on a type of the device, the devices may form an IP connection established over a direct network connection. For example, a personal computer may form a Layer 3 connection to a wireless printer over a Layer 2 WI-FI DIRECT™ connection.

Regardless of the manner in which devices initially discover and pair, the information obtained by a device in conjunction with its pairing with a remote device may be stored in a suitable storage location. This information may be stored such that it is available for later use in establishing a Layer 3 connection to the remote device without the need for repeating the discovery and pairing processes. It should be appreciated that a device may store information about multiple devices paired with that device. For example, more than one personal computer may pair with the same wireless printer that may be then shared by users of the computers. In some embodiments, the printer may therefore store information on each of the computers obtained as a result of pairing process. Alternatively or additionally, the computers each may store information on the printer.

In scenarios in which a device is a computing device, information about devices with which the device has exchanged information for supporting a Layer 3 connection may be displayed on a user interface of the computer in a manner that indicates that the device is available to provide Layer 3 services. In some embodiments, the remote devices may be presented in a list of installed devices. The information may be displayed in any suitable manner—for example, if the remote device is a printer, an icon depicting a printer may be displayed. As another example, the information about the device may be displayed indirectly, such as by indicating that a service provided by the remote device is available. Though, it should be appreciated that embodiments of the invention are not limited with respect to a particular way of providing information about devices paired with the computer.

In some embodiments, once the pairing process between any two devices is complete, the device may suspend its communication at Layer 3 entirely. For example, the device can disconnect from an access point so that it can stop receiving and transmitting communications that occur as part of being connected to a network at Layer 3. For instance, after a computer pairs with a wireless printer and it is determined that the IP connection to the printer is not active, the IP connection between these devices may be terminated. Because the IP connection was established over an underlying Layer 2 connection, in some embodiments, the devices may also disconnect at Layer 2.

Despite the fact that a remote device is no longer connected to a network at Layer 3, the device may continue to indicate the availability of the remote device for providing services over the Layer 3 network. In some embodiments, the device may indicate the availability of those services without monitoring whether the remote device remains available to provide those services. In such an embodiment, if a user indicates an interest in obtaining services from a remote device, the device may then attempt to reestablish a connection at Layer 3 to the remote device that provides the requested service.

As part of attempting to reestablish the connection, a device may determine whether the remote device is available. That determination may be made based on whether the attempt to form a connection is successful. Alternatively, a determination of the presence of the device may be made by using a discovery protocol. Though, it is not a requirement that a Layer 3 discovery protocol be used or be the only protocol used. In some embodiments, upon receipt of input indicating reconnection to a remote device for Layer 3 services, the device may attempt to discover the device using a Layer 2 discovery protocol.

Discovery of the remote device through the Layer 2 discovery protocol may be used as a condition on attempting to reconnect at Layer 3. In this way, Layer 3 communication may only occur if the remote device is located through Layer 2. Though, in some embodiments, using a Layer 2 discovery protocol may be performed first, but a Layer 3 communications may occur to attempt to detect or connect to the remote device if the Layer 2 discovery fails.

In other embodiments, a Layer 2 discovery protocol may be used to obtain information indicating the presence of remote devices even before a user indicates a desire to access a service from a remote device. In some embodiments, while the IP connection established between the devices is suspended, presence of the remote devices may be monitored at Layer 2. Any suitable Layer 2 device discovery mechanism may be used for the monitoring. For example, a device discovery mechanism in accordance with a WI-FI DIRECT™ or BLUETOOTH® standard may be utilized. Though, it should be appreciated that any suitable device discovery mechanism at Layer 2 may be substituted, as embodiments of the invention are not limited in this respect.

The techniques described herein may be selected to use for device discovery based on a type of a device to be discovered. Because the Layer 2 device discovery is a short-range discovery technique, it may only be practical to use the described techniques for devices connected on the same wireless LAN or connected through the same access point. Alternatively or additionally, the Layer 2 device discovery techniques may be used for devices that are used when in proximity to each other, such as a computer and a TV in a home environment or a computer and a printer in an office. It should be appreciated that embodiments of the invention are not limited with respect to types of devices that can implement the Layer 2 device discovery techniques as long as such devices can communicate at short-range.

In some embodiments, the device discovery mechanism in accordance with a Layer 2 technology may involve sending, by a first computing device monitoring presence of a second computing device, probe requests to the second computing device for information about presence of the second computing device. If the second computing device is present, it may respond to the requests. The requests may be sent to the second computing device in any suitable manner. In some embodiments, the requests may be sent periodically. For instance, if a first computing device monitors presence of a second computing device in accordance with a WI-FI DIRECT™ protocol, the first computing device may sent a WI-FI Probe Request message to the second computing device at periodic intervals. Though, it is not a requirement that the probes be sent at evenly spaced intervals, and such probes may be sent with any suitable timing. If the second computing device is present, the device may respond to the WI-FI Probe Request message with a WI-FI Probe Response message to notify the first computing device of its presence.

As another example of a discovery mechanism, in some embodiments, the second computing device may send periodic messages in accordance with a Layer 2 device discovery protocol, which may be called heartbeat messages, to notify the first computing device that the second computing device is available to the first computing device. The heartbeat messages may comprise, for example, conventional Layer 2 broadcast messages. It should be appreciated that the requests may be sent other than at periodic time intervals, as embodiments of the invention are not limited to a particular way of probing a device whose presence is being monitored in accordance with a Layer 2 device discovery mechanism. For example, the requests may be sent at a certain time.

Monitoring presence of a device at Layer 2 allows presenting information to a user on availability of the monitored device. Thus, as a specific example, if a computer monitors presence of a wireless printer that was previously paired with the computer, the printer, if determined to be present, may be added to a list of devices available to the computer. Accordingly, in this case, on a computing device that distinguishes between installed and available devices, a representation of the printer (e.g., an icon or any other visual representation) may be displayed in both a list of devices installed on the computer and a list of devices available to the computer. The list of available devices may include devices whose presence has been determined in any suitable way—for example, the list of available devices may include one or more devices to which an active IP connection is being maintained.

The list of available devices may be presented on a user interface of the computer in any suitable form. Furthermore, as the computer monitors presence of the printer and other devices paired with the computer, the list of available devices may be updated to indicate devices currently available to the computer. Thus, if the computer detects that the printer is not present, the representation of the printer may be removed from the list of available devices. Similarly, a device that is determined to be present may be added to the list.

An indication that one or more devices are determined to be available by a monitoring device may be provided in a manner other than displaying a representation indicating that the devices are available on a user interface. For example, once the device is present, an action may be taken that depends on the device being available. Such an action may be taken in response to user input or any other trigger event.

In some embodiments, after a Layer 3 connection to the device is suspended, presence of a device using a Layer 2 device discovery mechanism may not be monitored continuously. Rather, presence of the device may be determined upon an occurrence of an event triggering the determination, which may comprise any suitable type of event indicating that use of the device is desired. For example, after a first computing device, such as a computer, pairs with a second computing device, such as a printer, and a Layer 3 connection between the devices is subsequently suspended, no monitoring of each other's presence by either of the devices may be conducted. However, when a user of the computer indicates (e.g., via a user interface) that use of the printer is desired, this indication may serve as a trigger for the computer to determine presence of the printer.

The indication of an attempt to use a remote device may be provided in any suitable way. For example, user input may be received with respect to a representation of the device on a list of installed devices or displayed in any other form on a user interface. The trigger may also comprise powering up the device. As another example, an indication may be opening an application or other request to use some functionality of the device. Though, it should be appreciated that embodiments of the invention are not limited to any particular way of indicating an attempt to use the device.

An attempt to use a device over a Layer 3 connection that has been suspended may result in a determination, based on a Layer 2 device discovery mechanism, that the device is not present and therefore is not available. A suitable action may be taken when the device is not present. For example, if the printer is determined not to be present in response to an indication of an attempt of its use, a suitable action may be taken. For example, an alternative printer may be suggested and/or selected by a user. If the alternative printer is installed but its presence has not been determined, the availability of that printer may be determined using a Layer 2 device discovery mechanism in accordance with some embodiments.

If another device available to the computer is capable of functionality provided by the printer determined to be unavailable, an attempt to use that device may be made. Alternatively or additionally, one or more notifications may be provided to the user informing the user that the device whose use is requested is not available and what other devices, if any, are available to be used instead of the requested device.

Regardless of whether presence of a remote device is determined in response to a trigger event, such as an indication of an attempt to use the device, or as a result of continuously monitoring presence of the device in accordance with some embodiments, the Layer 3 connection to the device may be reestablished if the device is determined to be present. Accordingly, the techniques described herein allow, while the connection to the remote device at Layer 3 has been suspended, determining presence of the device using a Layer 2 device discovery mechanism, and, based on the determination, reestablishing the connection to the device at Layer 3.

In some embodiments, when a remote device connected via an access point to an IP network is not actively in use, Layer 3 communications to this device may be suspended—e.g., the device may disconnect from the access point and thus leave the IP network. In response to subsequent determining of presence of the remote device at Layer 2, the remote device may reconnect at Layer 3. Thus, it may rejoin the IP network by reconnecting to an access point.

Once the connection to the remote device is reestablished, functionality of the remote device may be accessed. For instance, referring to the above computer/printer scenario, when the IP connection to the remote printer is reestablished, the printer may be used to print documents. As another exemplary scenario, a computer may discover and establish an IP connection with a wireless TV. While the IP connection is terminated, in response to receiving an indication of an attempt to stream data to the TV, the computer may determine, using a Layer 2 device discovery mechanism, presence of the TV and, when the TV is determined to be present, the IP connection to the TV may be reestablished and data may be streamed to the TV from the computer.

In some embodiments, the user experience may be improved by reducing power consumption by the device due to the reduction of an overhead associated with keeping the Layer 3 connection alive when the connection is not actively used. Moreover, power that would be required to process messages exchanged between the devices to maintain the Layer 3 connectivity may be saved. Reduced power consumption may be apparent to the user through longer battery life, for example.

Furthermore, eliminating the requirement to maintain the Layer 3 connection may make it unnecessary to maintain an underlying connection to the device at Layer 2. Thus, power that would otherwise be expended for connecting to the Layer 2 network may be saved. The reduction in power consumption may be particularly useful for devices operating using battery as a power source. Further, because the need for communications associated with maintaining a Layer 3 connection is eliminated, the total amount of communications is reduced, which can decrease "spectral pollution," which can interfere with the overall effectiveness of wireless communications by other devices in the area.

Another improvement resulting from utilizing the described techniques may include increasing availability of a device that is capable of supporting only a single connection at Layer 2 with another device. Maintaining an IP connection to such device, which expends the single Layer 2 connection that may be established by the device, may prevent its use by other devices, even though the IP connection is used solely for monitoring presence of the device and not to use the device's functionality. Accordingly, in such scenarios, terminating the Layer 2 connection to a device because it is no longer needed to support the suspended IP connection while device presence is monitored but the device is not in use, may allow the device to engage in communication with other devices.

Furthermore, in some scenarios, a device (e.g., a laptop) connected via an IP connection through an access point to a remote device with which the laptop has paired, may monitor presence of the remote device using an IP-based discovery protocol. However, if the laptop is physically moved away from the access point so that it becomes disconnected from the access point, a Layer 2-based device discovery mechanism in accordance with some embodiments may be initiated at the laptop to monitor presence of the remote device, instead of the IP-based discovery protocol. This may improve user experience because the user is not required to keep the laptop or other device within the reach of the access point for the device to continue being informed about other remote devices it has paired with. Though, it should be noted that the laptop may only detect presence of the remote device at Layer 2 if the laptop and the remote device are located within a short-range communication distance of each other. When the user of the laptop desires to access the services provided by the remote device over the IP connection, the user may bring the laptop back to a location that is reachable by the access point so that the IP connection to the access point may be reestablished. Though, the laptop may alternatively form a Layer 3 connection over a direct Layer 2 connection.

The described techniques for device presence monitoring may be advantageous in scenarios where devices communicating in accordance with the WI-FI DIRECT™ standard, which is an example of P2P Specifications, support only a single connection at Layer 2 with another device. Maintaining constant IP connectivity over a WI-FI DIRECT™ connection between two such devices may prevent use of those devices by any other device in their vicinity. Accordingly, in such scenarios, terminating the Layer 2 connection to a device while device presence is monitored but the device is not in use, may allow the device to engage in communications with other devices.

The forgoing techniques may be used in any suitable environment. FIGS. 1 and 2 illustrate environments in which presence of a remote computing device may be detected according to some embodiments.

In the example of FIG. 1, an exemplary device, such as computer 102 illustrated as a laptop computer, may pair with and establish a Layer 3 connection to another device, shown by way of example as a remote wireless printer 104. Though, it should be appreciated that other types of devices having short-range communication capability may implement techniques for device discovery at Layer 2 according to embodiments of the invention. For example, the computing devices may comprise SmartPhones, PDAs, cameras, TVs, headsets and any other suitable devices that may be connected on the same wireless LAN or connected through the same access point.

In the illustrated exemplary scenario, computer 102 and printer 104 may be used in a home or office environment where a user 106 may use computer 102 to print documents on printer 104. User 106 may interact with computer 102 to control computer 102 to wirelessly connect with remote devices, such as printer 104.

FIG. 1A illustrates that computer 102 and printer 104 that have paired may be connected by establishing wireless connections 112 and 114, respectively, to the same access point 108 of a network 110. Network 110 may be a home network, an enterprise network, the Internet or any other suitable network. Any suitable technique may be used to form wireless connections 112 and 114, including techniques that employ known infrastructure type protocols. As one example, wireless connections 112 and 114 may be formed using a WI-FI protocol. Though, the specific protocol used is not critical to embodiments of the invention.

FIG. 1A illustrates schematically a Layer 3 connection 116 formed between computer 102 and printer 104 through wireless connections 112 and 114 to access point 108. It should be appreciated that connection 116 is formed over wireless connections 112 and 114 and is shown separately for representation purposes only. Connection 116 may be any suitable Layer 3 connection, such as an IP connection, established over a supporting Layer 2 connection.

Connection 116 is established between computer 102 and printer 104 after the devices pair in accordance with a known technique or any technique developed in the future. The devices may discover each other in accordance with any suitable device discovery mechanism. For example, computer 102 and printer 104 may discover each other using a device discovery mechanism operating at Layer 3, such as in accordance with an IP-based service discovery protocol. Simple Service Discovery Protocol (SSDP), Bonjour, Web Service (WS) Discovery or any other suitable protocol may be utilized.

Computer 102 may store information about capabilities of printer 104 obtained in conjunction with pairing with and establishing connection 116 to printer 104 in any suitable manner. The information may also be presented to user 106 of computer 102 in a suitable way. For example, the information may be presented by adding a representation of printer 104 to a list of devices installed on computer 102.

Figure 1B:
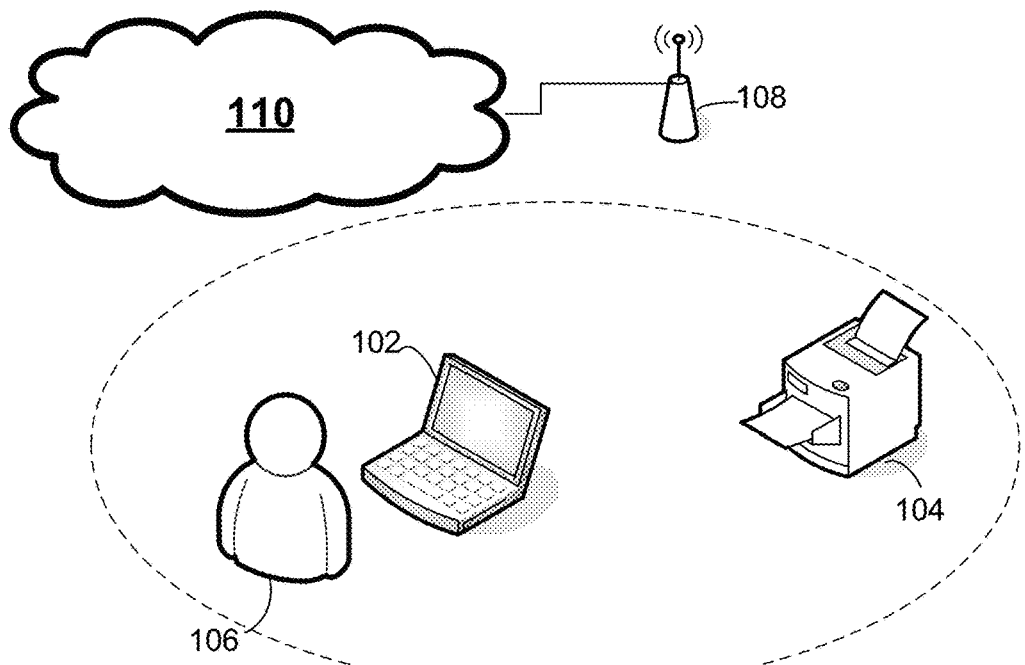
FIG. 1B is a sketch of an illustrative scenario in which the wireless connection between the devices of FIG. 1A is terminated after the device pairing.

Once computer 102 and printer 104 have paired, if printer 104 is not actively in use, communications to printer 104 at Layer 3 may be suspended. As illustrated in FIG. 1B, this may involve disconnecting printer 104 from access point 108 by terminating connection 114 which results in terminating connection 116 between computer 102 and printer 104. Though computer 102 may be connected via access point 108 to other devices (not shown), connection 112 established to connect to printer 104 via access point 108 may be terminated when connection 114 terminates. Alternatively or additionally, connection 116 may be directly terminated and/or connection 112 may be terminated.

Figure 1C:
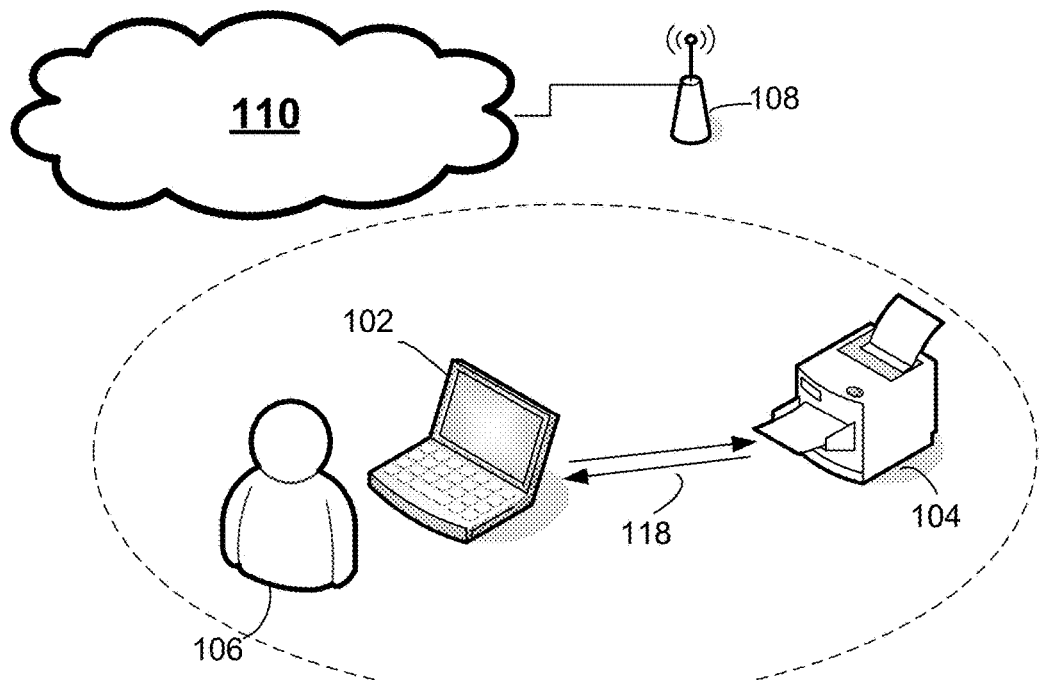
FIG. 1C is a sketch of an illustrative scenario in which a wireless device monitors for the presence of another device using a Layer 2 device discovery mechanism after the connection between the devices is terminated as shown in FIG. 1B.

Once the Layer 3 connection between computer 102 and printer 104 has been terminated, computer 102 may monitor presence of printer 104 using a Layer 2 device discovery mechanism 118, as shown schematically in FIG. 1C. Peer-to-peer protocols, such as a WI-FI DIRECT™, BLUETOOTH® or other suitable Layer 2 protocol may be utilized.

Any suitable Layer 2 device discovery mechanism may be used. For example, computer 102 may monitor for printer 104 by sending requests for information about presence of printer 104. If printer 104 is present, it may respond to the requests by sending to computer 102 appropriate responses indicating presence of printer 104. The requests and responses may be exchanged between the devices in any suitable manner. For example, WI-FI Probe Requests in accordance with a WI-FI DIRECT™ protocol may be sent periodically. If printer 104 is present, it may respond to a WI-FI Probe Request with a WI-FI Probe Response to notify computer 102 of its presence.

In some embodiments, printer 104 may notify computer 102 and other devices of its presence by sending periodic messages in accordance with a Layer 2 device discovery protocol, such as Layer 2 broadcast messages. It should be appreciated that the requests may be sent in a way different from sending requests at evenly spaced intervals. Thus, requests for device presence or notifications of device's presence may be sent with any suitable timing.

In some embodiments, computer 102 may not monitor presence of printer 104 continuously. Rather, Layer 2 device discovery mechanism 118 may be initiated in response to a suitable trigger event. For example, user input may be received though computer 102 indicating an attempt to use printer 104. The user input may comprise, for example, an indication to execute an application that accesses printer 104. In some embodiments, presence of printer 104 may be determined in response to powering up printer 104. Prior to a trigger event, no monitoring for printer 104 may be conducted by computer 102.

It should be appreciated that computer 102 is shown to determine presence of printer 104 by way of example only as, in some scenarios, both devices may determine each other's presence either continuously or in response to a trigger. A device may probe for presence of a remote device based on a type of the probing device. For example, a computer may probe for remote devices but devices that operate as computer peripherals may not actively probe for other devices.

Regardless of a way in which presence of printer 104 may be determined, information about presence of printer 104 may be provided through computer 102 in a suitable manner. For example, when printer 104 is determined to be available (e.g., when printer 104 responds to a probe request), the information may be displayed on a user interface of computer 102 in a list of available devices, that is updated as computer 102 determines presence of printer 104. Though, it should be appreciated that the information on presence of printer 104 may be provided in any suitable way.

Figure 1D:
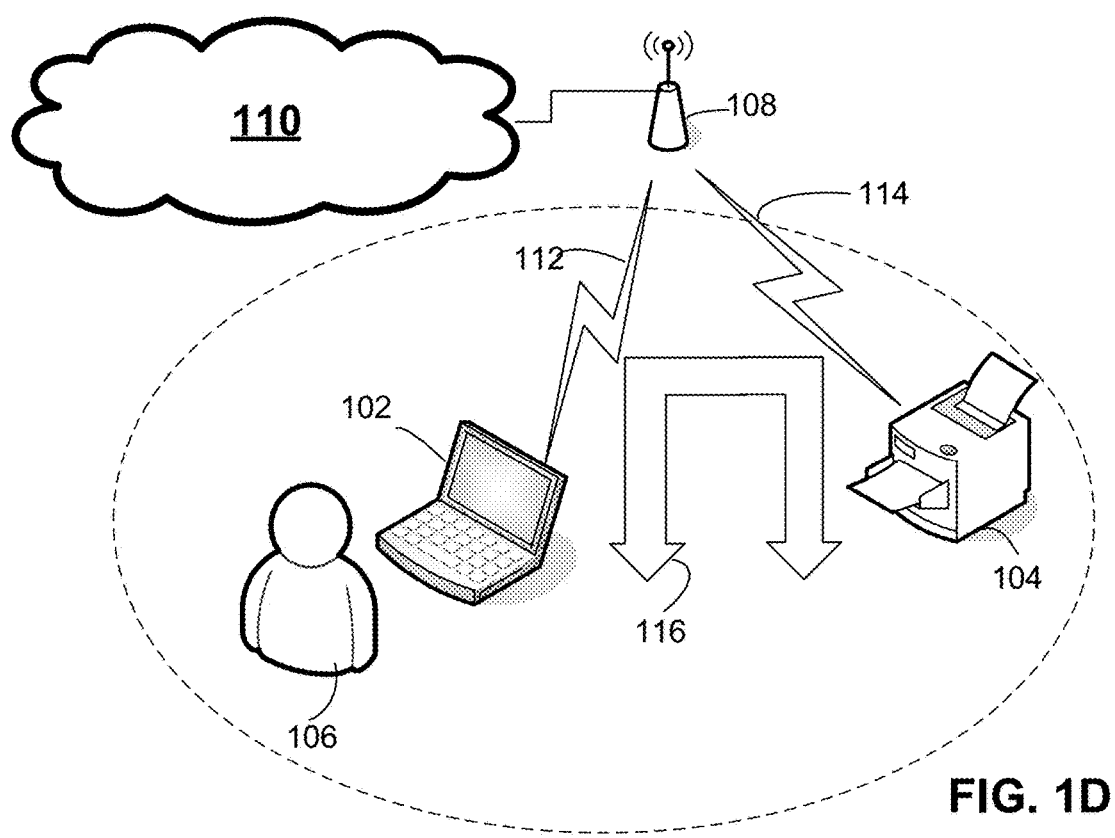
FIG. 1D is a sketch of an illustrative scenario in which the connection between the devices of FIGS. 1A-1C is reestablished at Layer 3, based on monitoring device presence using a Layer 2 device discovery mechanism as shown in FIG. 1C.

In some embodiments, when use of printer 104 is desired, connection 116 between computer 102 and printer 104 may be reestablished based on determining presence of printer 104 using a Layer 2 device discovery mechanism, as shown in FIG. 1D. Connection 116 may be reestablished when printer 104 rejoins network 110 by reconnecting to access point 108 via wireless connection 114. Printer 104 may be triggered to rejoin the network in any suitable way, including in response to commands sent over a direct Layer 2 connection.

An indication of use of printer 104 may be received in any suitable way, such as, for example, through a user interface of computer 102. In embodiments where presence of printer 104 is determined upon receiving an indication of an attempt to use printer 104, connection 116 may be reestablished once computer 102 determines presence of printer 104. Accordingly, in such embodiments, determining presence of printer 104 in accordance with a Layer 2 device discovery mechanism shown in connection with FIG. 1C is followed by reestablishing connection 116 based on the determination, as illustrated in FIG. 1D. Once connection 116 is reestablished, printer 104 may be utilized.

In some embodiments, a direct connection, rather than a connection through an access point, may be established between devices that have paired. The direct wireless connection may be formed in scenarios where devices are used in proximity to each other, such as in a home or office environment. It should be appreciated that the wireless peer-to-peer connection to a remote device may be established in many different scenarios, as embodiments of the invention are not limited in this respect.

Figure 2A:
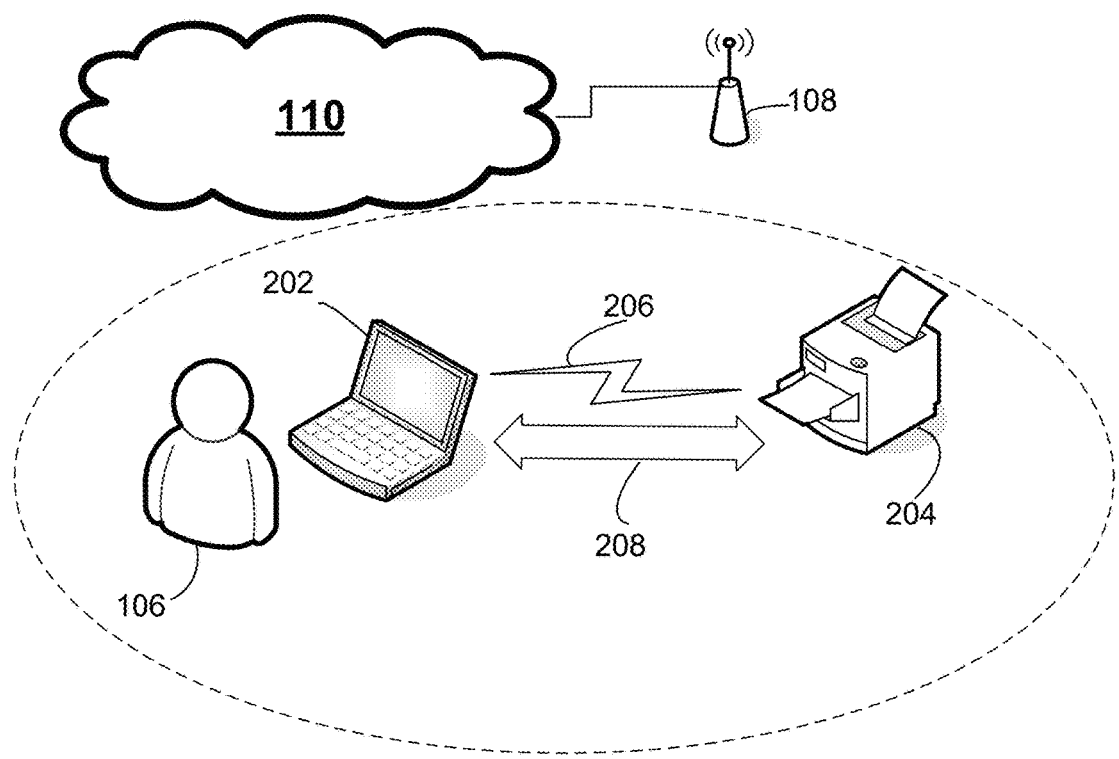
FIG. 2A is a sketch of an illustrative scenario in which a wireless connection is established via WI-FI DIRECT™ by devices that have paired.

FIG. 2 illustrates a scenario in which a wireless peer-to-peer connection is established via WI-FI DIRECT™ by devices that have paired. FIG. 2 shows computer 202 and printer 204, which may be similar to computer 102 and printer 104 shown in FIG. 1. However, in FIG. 2A, a Layer 2 connection established between computer 202 and printer 204 after the devices have paired is a direct peer-to-peer connection 206, rather than a connection through access point 108.

In this example, direct connection 206 may be established in accordance with a WI-FI DIRECT™ protocol. Though, it should be appreciated that direct connection 206 may be established between computer 202 and printer 204 in accordance with any other short-range communication protocol, such as a BLUETOOTH® or other protocol. It should also be appreciated that computer 202 and printer 204 may be connected to other devices via suitable connections, which is not shown for the sake of simplicity.

FIG. 2A illustrates schematically that a Layer 3 over a Layer 2 connection, such as an IP connection 208 over a non-IP connection 206, may be formed between computer 202 and printer 204. It should be appreciated that connection 208 is formed over connection 206 and is shown separately for representation purposes only.

Figure 2B:
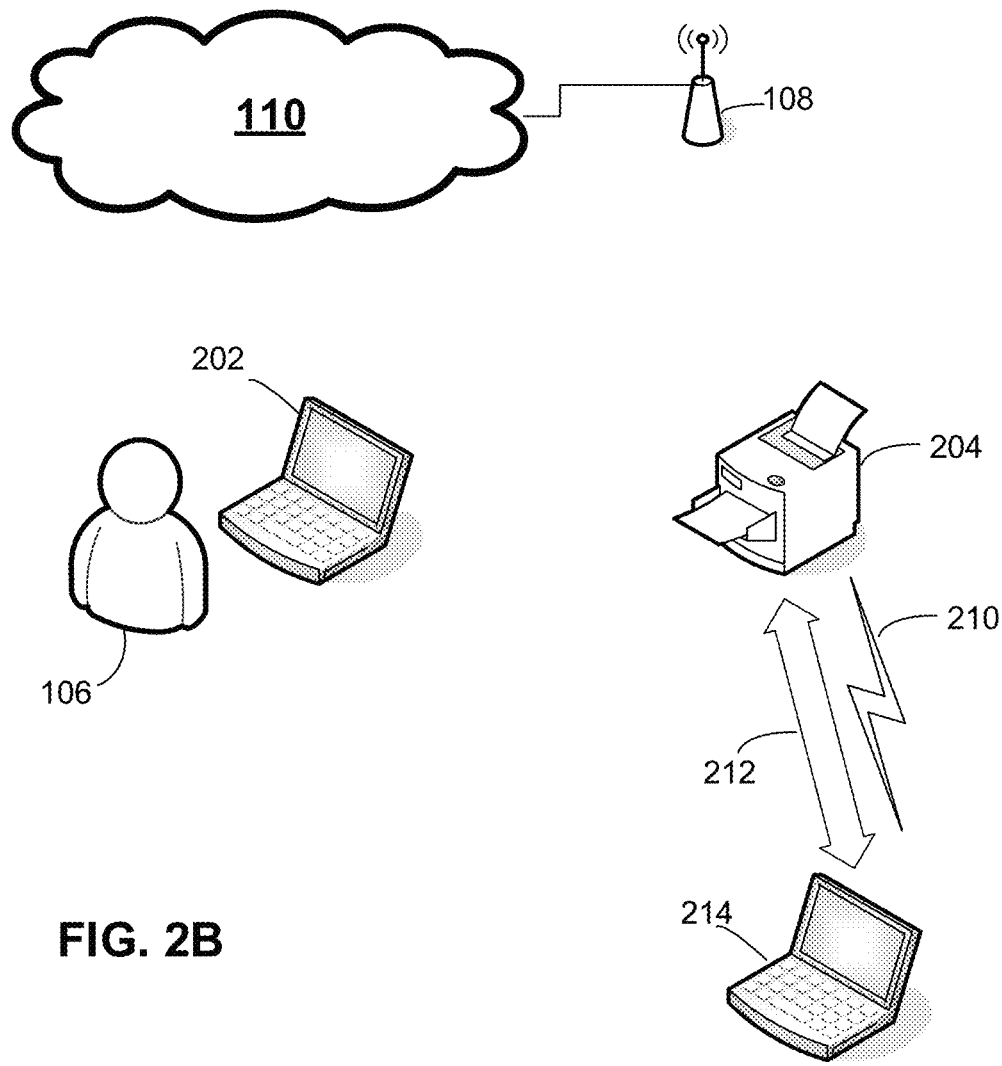
FIG. 2B is a sketch of an illustrative scenario in which a device whose presence is being monitored by one device using a Layer 2 device discovery mechanism has concurrently established a Layer 3 connection with another device.

Subsequent interactions between computer 202 and printer 204 may proceed in a way similar to that shown with reference to FIG. 1. Hence, when IP connection 208 to printer 204 is not actively used, printer 204 may suspend communications at Layer 3 to computer 202. This may involve terminating connection 208 which allows terminating underlying connection 206 established in accordance with a WI-FI DIRECT™ protocol. FIG. 2B illustrates that connections 206 and 208 to printer 204 may be terminated. Presence of printer 204 may be detected using a Layer 2 device discovery mechanism in accordance with some embodiments, similarly to determining device presence as shown in FIG. 1C.

FIG. 2B illustrates that, when Layer 3 connection 208 and underlying Layer 2 connection 206 to printer 204 are terminated, printer 204 may establish a connection at Layer 3 to another device. In some embodiments, a device may be capable of supporting only a single point-to-point connection at Layer 2 with another device. For example, printer 204 may be able to maintain only a single connection at Layer 2 to another device. Because the techniques described herein allow determining presence of printer 204 using a Layer 2 device discovery mechanism instead of a conventional IP-based mechanism, the IP connection and the underlying Layer 2 connection to printer 204 may be terminated when the printer is not in use.

Accordingly, as shown in FIG. 2B, when printer 204 disconnects from computer 202, printer 204 may establish a Layer 2 connection 210 to another device, such as, for example, a computer 214. Layer 2 connection 210 may be, for example, a WI-FI DIRECT™ connection that supports a Layer 3 connection 212. Connection 212 may be used to access functionality of printer 204 through computer 214. Thus, determining device presence using a Layer 2 device discovery mechanism in accordance with some embodiments may increase device availability, which is illustrated above using an example of printer 204, which is available to computer 214 because the printer's connection capacity is not consumed by a connection to computer 202.

It should be appreciated that, after connections 206 and 208 to printer 204 terminate and a Layer 2 device discovery mechanism is used to determine presence of printer 204, if use of printer 204 is desired, the Layer 2 and Layer 3 connections to printer 204 may be reestablished based on monitoring presence of printer 204, which is not shown in more detail for the sake of simplicity.

Figure 3:
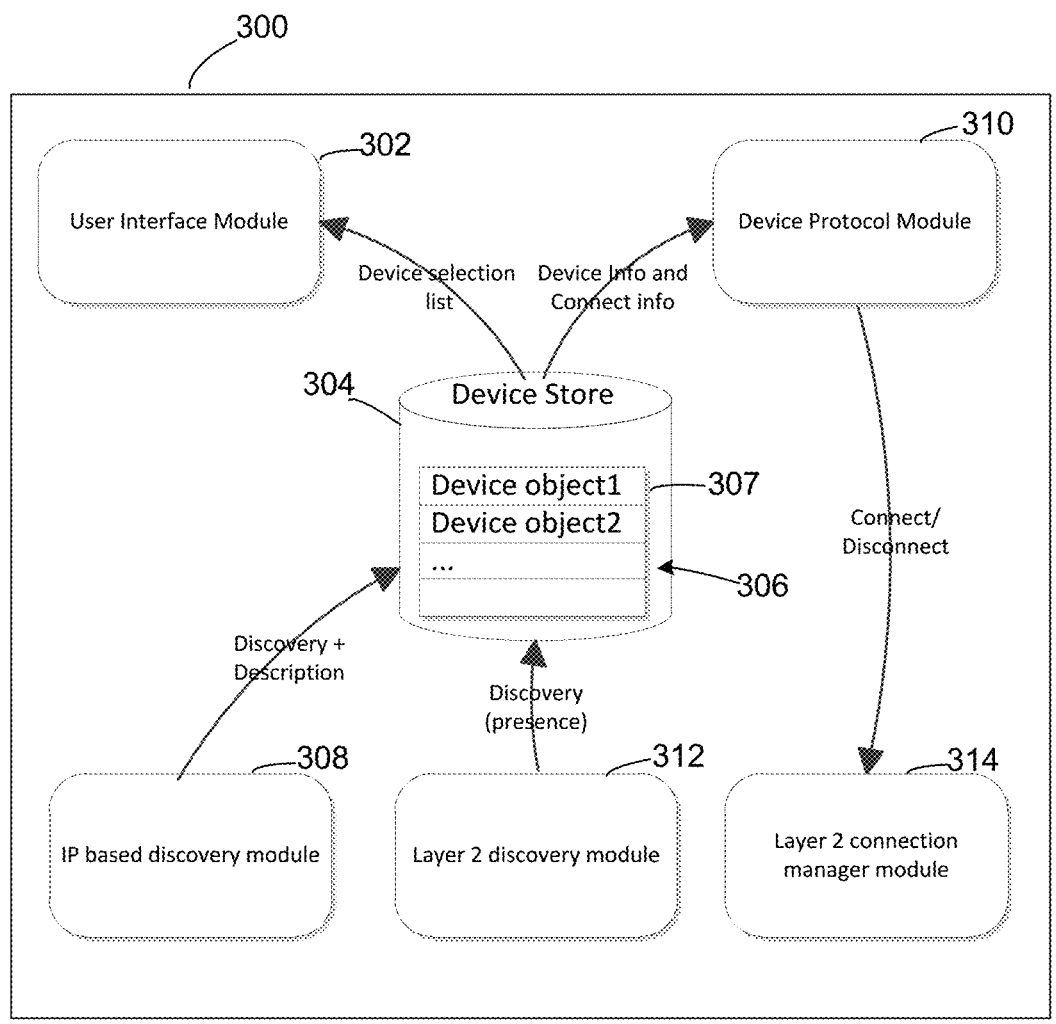
FIG. 3 is a block diagram of an illustrative embodiment of components within a computing device adapted to perform device presence monitoring at Layer 2 to support a Layer 3 connection.

FIG. 3 is a block diagram of an illustrative embodiment of components within a computing device 300 adapted to perform device presence monitoring at Layer 2 to support a Layer 3 connection, in accordance with some embodiments. The components shown in FIG. 3 may be implemented within any suitable device. For example, computer 102 (FIG. 1) or computer 202 (FIG. 2) may implement the components. Though, it should be appreciated that any suitable device may store the components shown in FIG. 3 in a suitable memory location and to execute the components via one or more processors.

FIG. 3 illustrates that computing device 300 may comprise a user interface component 302, which may be used to present a list of devices currently available to the user. The currently available devices may be determined by monitoring presence of devices with which computer 300 has paired using a conventional technique, such as an IP-based service discovery protocol or using a Layer 2 device discovery mechanism in accordance with some embodiments.

Suitable user input may be received in connection with user interface 302 indicating a selection of a device from the list of available devices. An exemplary implementation of user interface component 302 is shown in more detail in FIG. 4A.

FIG. 3 illustrates that computing device 300 may comprise a device store 304 that may store a collection of device objects 306 each representing a device to which computing device 300 has paired. Each device object may comprise suitable information on properties of a corresponding device. For example, if computing device 300 comprises computer 102 shown with reference to FIG. 1, a device object 307 from device objects 306 may store information on printer 104 after printer 104 paired with computer 102.

Properties of the device stored in the device object may comprise device identification information, such as its Friendly name, Manufacturer Name, Model Name/Number and other suitable properties of the device. The properties of the device may also indicate whether the device is currently available. Thus, user interface component 302 may query device store 304 for the list of available devices. A device object may also comprise information on how to connect to the device (e.g., an HTTP URL) and any other suitable information on the device.

FIG. 3 illustrates that computing device 300 may comprise an IP-based discovery module 308. IP-based discovery module 308 may operate to monitor device discovery in accordance with an IP-based service discovery protocol, such as, for example, SSDP, Bonjour, Web Service (WS) Discovery or any other protocol. IP-based discovery module 308 may therefore be used to collect device presence information and properties of the device over an IP network. To monitor device presence using IP-based discovery module 308, an IP connection to the monitored device may be maintained throughout the monitoring.

The presence information collected by IP-based discovery module 308 may be stored in a corresponding device object from device objects 306 in device store 304. This information may be updated when IP-based discovery module 308 detects changes in availability of the device.

When an indication of use of a device is received in a suitable manner (e.g., by selecting the device via user interface component 302), a device protocol module 310 may access device store 304 to obtain information stored in a corresponding device object. The information may comprise properties of the device and information on how to connect to and interact with the device using a device class specific protocol over IP. As an example, when a computer interacts with an UPnP Digital Media Server device to retrieve steaming data from the server, a device protocol module 310 may retrieve the HTTP URL from a corresponding device object and send UPnP messages (e.g., in accordance with the UPnP standard) as HTTP requests to that URL.

When presence of a remote device is monitored using IP-based discovery protocols, a Layer 3 connection to the device may be maintained. A device monitoring at Layer 3 may send messages in accordance with a protocol used (e.g., IP multicast messages) announcing its presence. The device may also respond to requests sent by other devices (e.g., IP multicast messages) monitoring its presence.

In some embodiments, device presence using an IP-based service discovery may be supplemented by device discovery at Layer 2. Accordingly, referring back to FIG. 3, computing device 300 may include Layer 2 discovery module 312 that executes to determine device presence in accordance with a suitable Layer 2 device discovery mechanism. For example, a WI-FI DIRECT™ or BLUETOOTH® protocol may be used to determine device presence, by either continuously monitoring device presence or determining device presence is response to a suitable trigger event.

Determining presence of a remote device using a Layer 2 device discovery mechanism does not depend on an IP connection with the remote device. Thus, obtaining device presence information through device discovery at Layer 2 allows reducing power consumption without degrading the device's availability due to the elimination of the requirement to keep the Layer 3 connection to the device alive and to therefore maintain an underlying Layer 2 connection. Device presence may be determined at Layer 2 while the Layer 3 connection to the device is terminated such that the Layer 3 connection may be reestablished when an indication of use of the remote device is received.

In some embodiments, computing device 300 may utilize only a Layer 2 device discovery mechanism implemented by Layer 2 discovery module 312 to monitor presence of a remote device when the remote device is not in use. In other embodiments, IP-based discovery module 308 may operate to determine device presence while an IP connection to the device remains active. When the IP connection is terminated, Layer 2 discovery module 312 may be initiated to conduct device discovery using a Layer 2 device discovery mechanism.

As discussed above, because determining device presence in accordance with a Layer 2 device discovery mechanism does not require a Layer 3 connection (e.g., an IP connection) to the device, an underlying Layer 2 connection supporting the Layer 3 connection may be terminated as well. For example, when a remote device (e.g., printer 104) disconnects from an access point (e.g., access point 108), a Layer 2 connection to the access point may be terminated (FIGS. 1A and 1B). As another example, a direct Layer 2 connection to a remote device, such as printer 204, may be terminated (FIGS. 2A and 2B).

Computing device 300 may include a Layer 2 connection manager module 314 that may be utilized to reestablish a Layer 2 connection to the remote device after the Layer 2 and Layer 3 connections to the device have been terminated. The Layer 2 connection to the device may be reestablished in response to an attempt to use the device or other suitable trigger.

When the device reconnects at Layer 2, IP connectivity over the Layer 2 connection to the device may be reestablished. Reestablishing the Layer 3 connection may involve requesting or providing an IP address through a Dynamic Host Configuration Protocol (DHCP), bringing up the TCP/IP stack or any other suitable way of reconnecting the device at Layer 3.

Once the IP connection to the remote device is reestablished, device protocol module 310 may use previously stored information about the remote device (e.g., information obtained during pairing with the device) and the IP connection information to interact with the device over the IP connection.

In some scenarios, when the Layer 3 connection to the remote device is reestablished, an IP address of either of the devices may be different from an IP address that the device had during the pairing process. The IP address may change for a number of reasons. For example, a previously stored (e.g., in a device object of device store 304) HTTP URL to access a remote device may become stale. Accordingly, the remote device may be re-discovered at Layer 3 to obtain the current IP address of the device. It should be appreciated that the remote device may re-discover computing device 300 as well.

When the use of the device is complete, device protocol module 310 may instruct Layer 2 connection manager module 314 to disconnect the Layer 2 connection with the device and presence of the device may again be monitored using a Layer 2 device discovery mechanism in accordance with some embodiments.

Computing device 300 may comprise other components not shown herein for the sake of simplicity. Thus, computing device 300 includes one or more processors that may execute the components shown in FIG. 3. It should be appreciated that computing device 300 may comprise any suitable components, as embodiments of the invention are not limited in this respect.

Figure 4A:
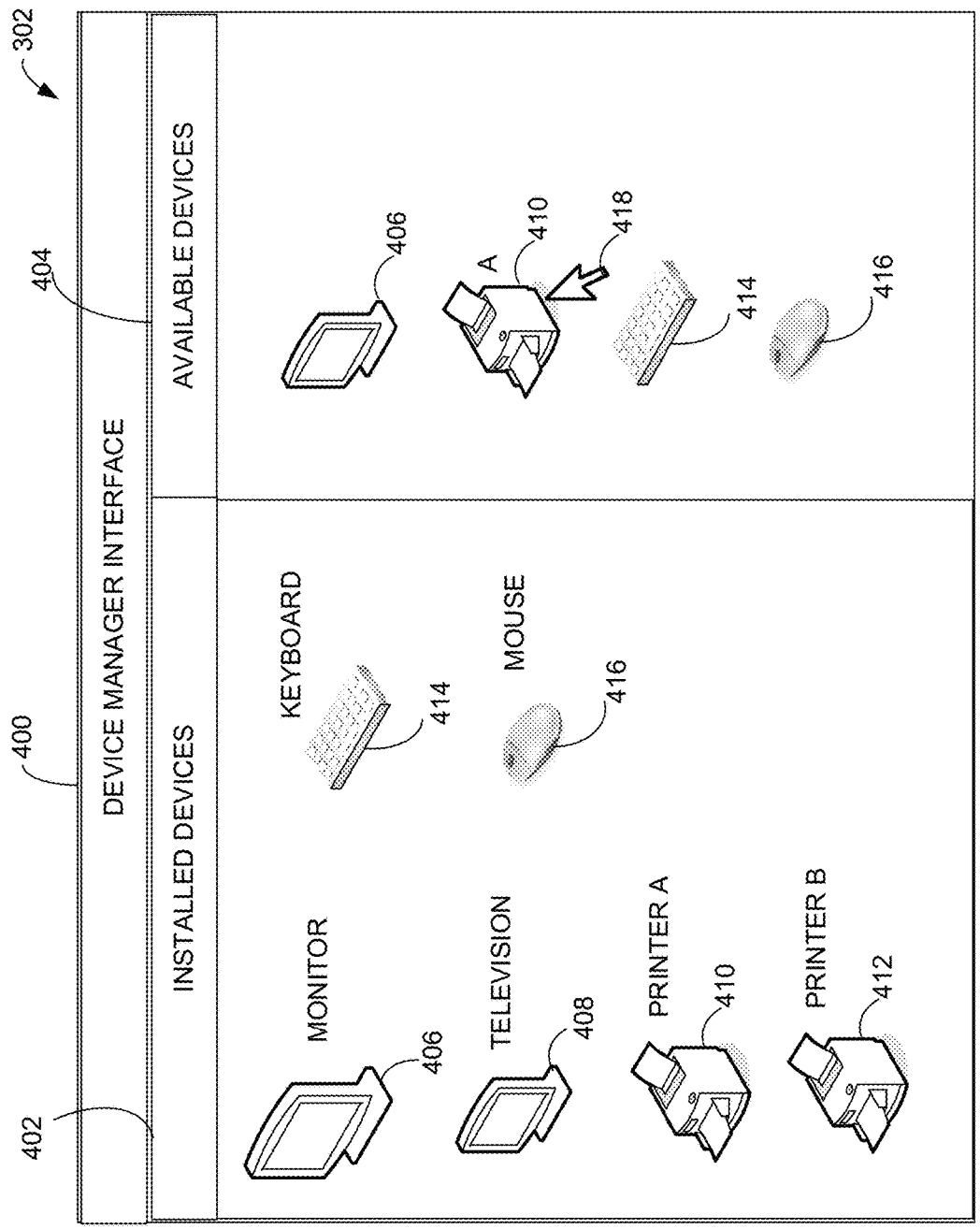
FIG. 4A is a sketch of an exemplary user interface displaying a list of installed devices and a list of currently available devices, based on device presence monitoring at Layer 2, in accordance with some embodiments.

FIG. 4A illustrates an exemplary user interface, such as a device manager interface 400, provided by user interface component 302 through which a user may view and select devices paired with computing device 300. As shown in FIG. 4A, device manager interface 400 may comprise a list of installed devices 402 and a list of currently available devices 404.

List of installed devices 402 may include representations of devices paired with computing device 300. Computing device 300 may store information on capabilities of each of such devices in a suitable storage medium, such as device store 304 (FIG. 3). Drivers for controlling the devices may be installed on computing device 300 or computing device may otherwise be configured to access services provided by those devices.

FIG. 4A illustrates by way of example that list of installed devices 402 may comprise a monitor 406, a TV 408, a printer 410 ("printer A"), a printer 412 ("printer B"), a keyboard 414 and a mouse 416. It should be appreciated that icons visually resembling corresponding devices are displayed in list of installed devices 402 in FIG. 4A by way of example only, and any suitable indication of installed device(s) may be utilized, as embodiments of the invention are not limited in this respect.

Not all of the devices paired with computing device 300 may be available for use at a certain point in time. For example, a remote device, such as a wireless printer with which computing device has paired, may be turned off and thus become unavailable for printing documents. As another example of a scenario when a remote device becomes unavailable for use through computing device 300 may include carrying the remote device away so that it is no longer within the reach of an access point or a wireless radio. Accordingly, presence of these devices may be monitored by computing device 300 so that functionality of any of the devices may be accessed without a delay when use of the device is desired.

A remote device may be taken to be available when a suitable mechanism used to determine the device's presence indicates that the device is currently available—e.g., that one or more responses to probe requests are received from the device, an appropriate notification is received from the device or the device is otherwise determined to be present. As shown in FIG. 4A, device manager interface 400 may comprise list of available devices 404 which indicates, based on device presence monitoring, which of the installed devices 406, 408, 410, 412, 414 and 416 are currently available.

In some embodiments, device presence may be continuously monitored using a Layer 2 device discovery mechanism. If a remote device is determined to be present, this may be indicated in a suitable manner, such as by displaying a representation of the device in list of available devices 404. As shown in FIG. 4A, list of available devices 404 comprises monitor 406, printer 410, keyboard 414 and mouse 416 indicating that these devices may be used through computing device 300.

One or more of the currently available devices indicated on list of available devices 404 may be selected using any suitable mechanism. For example, user input may be received in connection with a representation of a device that is desired to be used. FIG. 4A illustrates that, as an example, printer 410 which is the only printer available for use among installed printers 410 and 412, may be selected, as schematically shown by an arrow 418. When presence of printer 410 is determined in accordance with a Layer 2 device discovery mechanism while a Layer 3 connection to the printer is terminated, upon the selection of printer 410 for use, a Layer 3 connection to printer 410 may be reestablished.

Figure 4B:
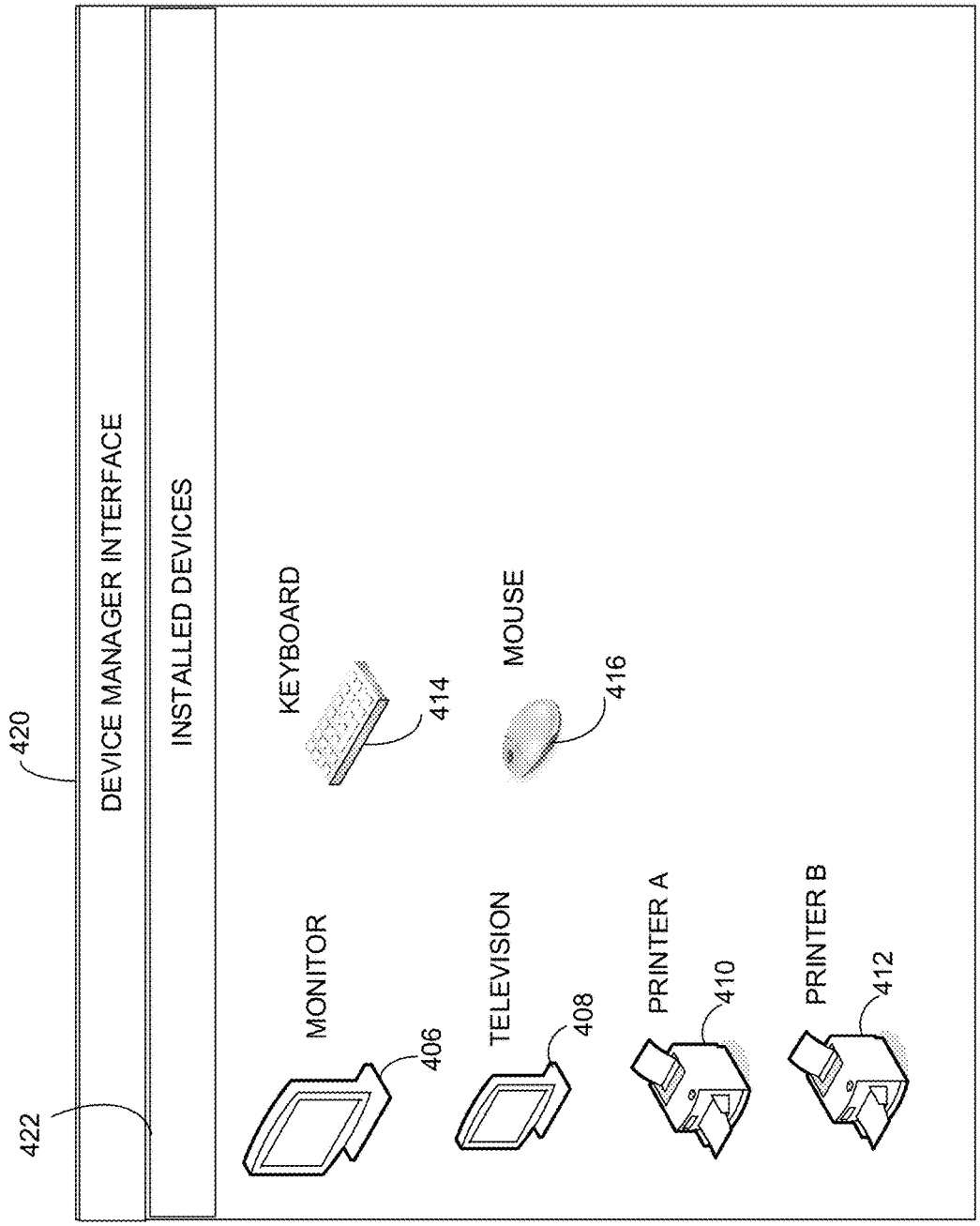
FIG. 4B is a sketch of an exemplary user interface displaying a list of installed devices.

For comparison purposes, FIG. 4B illustrates another device manager interface 420 which includes only a list of installed devices 422. List of installed devices 422 comprises, by way of example only, the same devices as those shown in list of installed devices 402 in FIG. 4A. Such a user interface may be used in place of device manager interface 400 in embodiments in which a computer does not monitor for presence of remote devices once a Layer 3 connection is terminated. In such scenarios, the computer may not generate a list of available devices.

Figure 5:
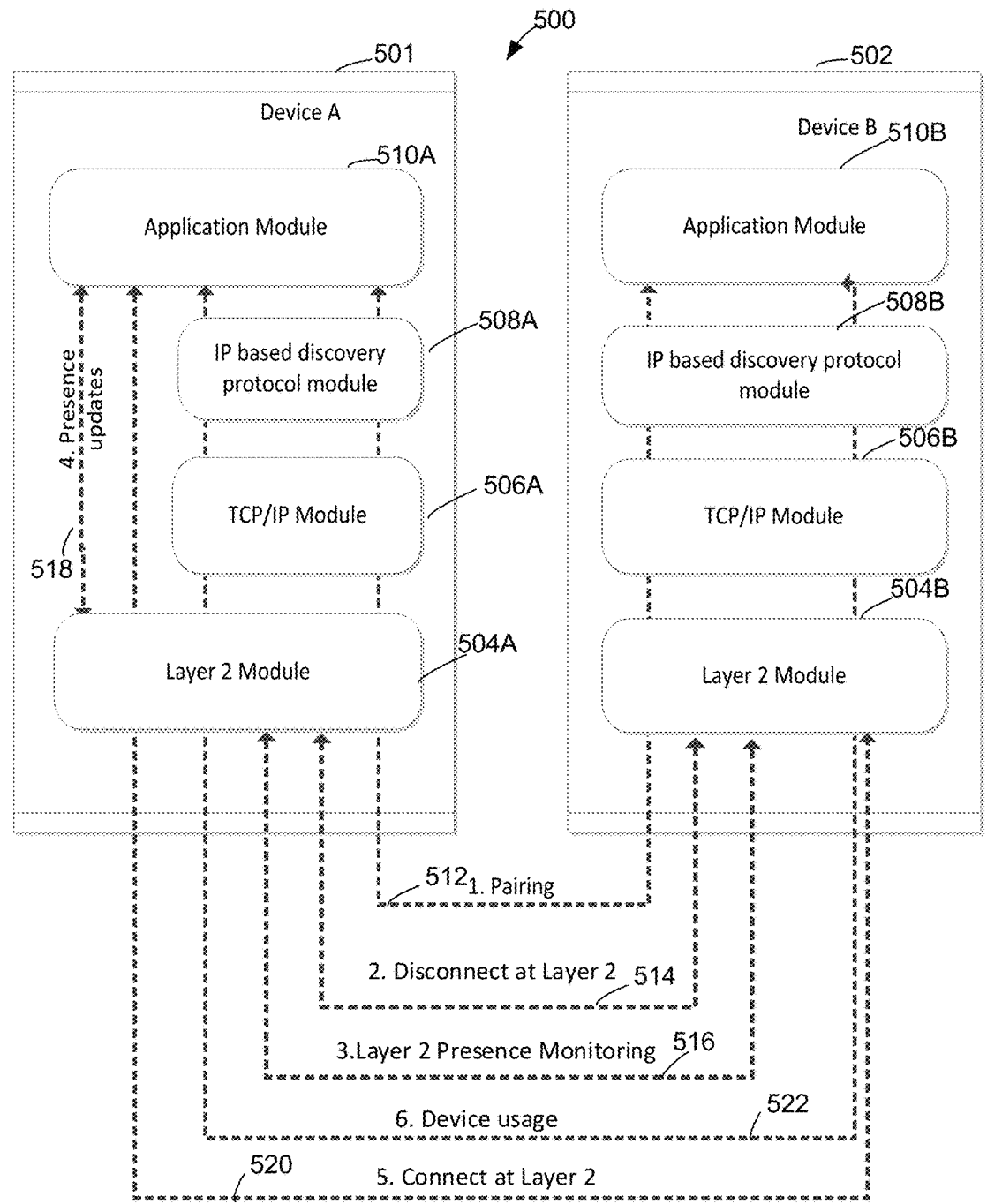
FIG. 5 is an exemplary embodiment of a method of monitoring device presence.

FIG. 5 illustrates schematically an environment 500 in which an exemplary device A (501) may monitor presence of a remote exemplary device B (502) using a Layer 2 device discovery mechanism in accordance with some embodiments after the devices pair. FIG. 5 also illustrates layers of the OSI layered model of network connectivity that may participate in monitoring device presence as illustrated in this example.

Accordingly, device A may include, starting from the lowest layer, a Layer 2 module 504A, a TCP/IP module 506A, an IP-based discovery module 508A, and an application module 510A. In this OSI model, each layer relies on communication being established at the lower layers, as known in the art. Similarly, device B may include, starting from the lowest layer, a Layer 2 module 504B, a TCP/IP module 506B, an IP-based discovery module 508B, and an application module 510B. It should be appreciated that devices A and B may include any other suitable components used to monitor device presence in accordance with some embodiments and to perform other functionality.

As shown schematically in FIG. 5, devices A and B pair at 512. The pairing may involve devices' discovering each other via a Layer 2 protocol, which uses Layer 2 module 504A at device A and Layer 2 module 504B at device B, and establishing a Layer 3 (e.g., an IP) connection between the devices via TCP/IP modules 506A and 506B. The Layer 3 connection may be utilized by an IP-based discovery protocol of IP-based discovery modules 508A and 508B that allow devices A and B to learn about each other's capabilities and services. These capabilities and services may be utilized by application modules 510A and 510B to execute a suitable application that provides services when devices A and B interact.

After the pairing and establishing of the Layer 3 connection between devices A and B is complete, device B may disconnect at Layer 3, which avoids the need to maintain the underlying Layer 2 connection to device B which is therefore terminated at 514. Device B may disconnect at Layers 2 and 3 when it is determined that the Layer 3 connection to that device is not actively used or based upon other suitable determination. Disconnecting Device B terminates, as discussed above, the Layer 3 and Layer 2 connections between devices A and B.

Once the Layer 3 and Layer 2 connections to device B are terminated, device A may monitor presence of device B at Layer 2 (516), such as using a suitable Layer 2 device discovery mechanism. As presence of a remote device is monitored using a Layer 2 device discovery mechanism, updates about the device's presence may be provided to the application on the monitoring device that may use functionality of the remote device. Thus, FIG. 5 shows that Layer 2 module 504A may provide updates (518) on availability of device B to application module 510A, based on monitoring presence of device B using a suitable Layer 2 device discovery mechanism. The updates may be used to, for example, update a list of devices currently available to a user of device A (e.g., list of available device 404 in FIG. 4A).

When use of device B is desired, Layer 2 connection to device B may be reestablished (520), based on monitoring presence of device B using a suitable Layer 2 device discovery mechanism. Reconnecting device B at Layer 2 allows reestablishing a Layer 3 connection to the device. Accordingly, devices A and B may interact so that device B may be used (522) to provide services to a user. The services may be provided over the reestablished Layer 3 connection.

Figure 6:
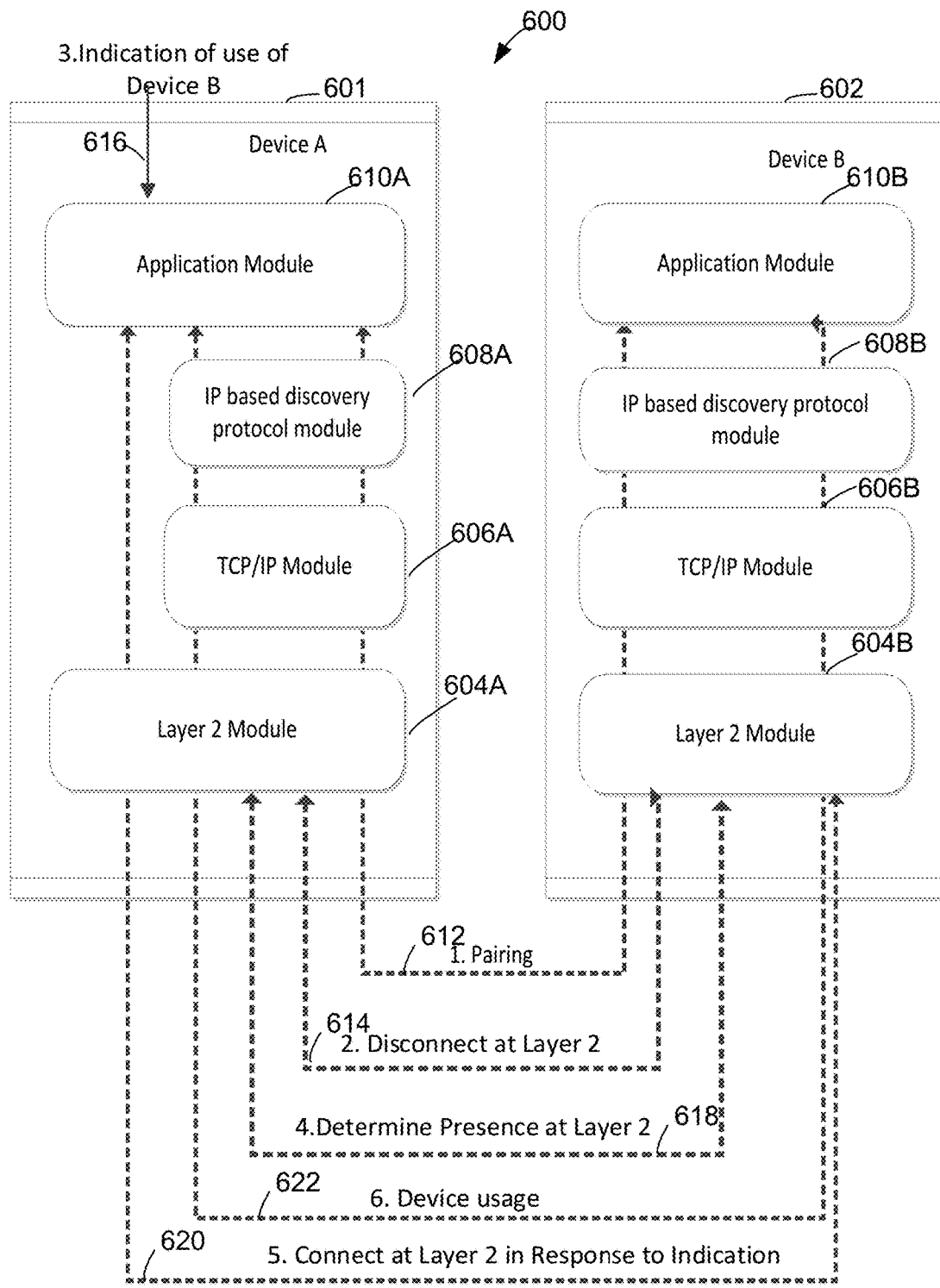
FIG. 6 is an exemplary embodiment of a method of determining device presence in response to an indication of an attempt to use of the device.

FIG. 6 is illustrates another environment 600 in which remote device presence is determined in response to an indication of an attempt to use that device. FIG. 6 includes features similar to those illustrated in FIG. 5. Thus, FIG. 6 includes device A (601) and device B (602) each comprising the same layers in accordance with the OSI model as those found in devices 501 and 502. It should be appreciated that devices A and B may include any other suitable components used to monitor device presence in accordance with some embodiments and to perform other functionality.

In FIG. 6, devices A and B may pair at 612 and disconnect at Layer 2 (614) and at Layer 3, in a way similar to that shown in conjunction with FIG. 5. However, no continuous monitoring of presence of device B by device A may be conducted in the example of FIG. 6 while device B is disconnected. Rather, determining presence of device B may be performed upon a suitable trigger event, such as an indication of an attempt to use device B at 616.

Accordingly, in response to the indication, presence of device B may be determined (618) at Layer 2—for example, using a suitable Layer 2 device discovery mechanism. If presence of device B is determined at Layer 2, the Layer 2 connection to device B may be reestablished at 620. Reconnecting device B at Layer 2 allows reestablishing a Layer 3 connection to the device. Next, devices A and B may interact so that device B may be used (622) to provide services to a user. The services may be provided over the reestablished Layer 3 connection.

Figure 7:
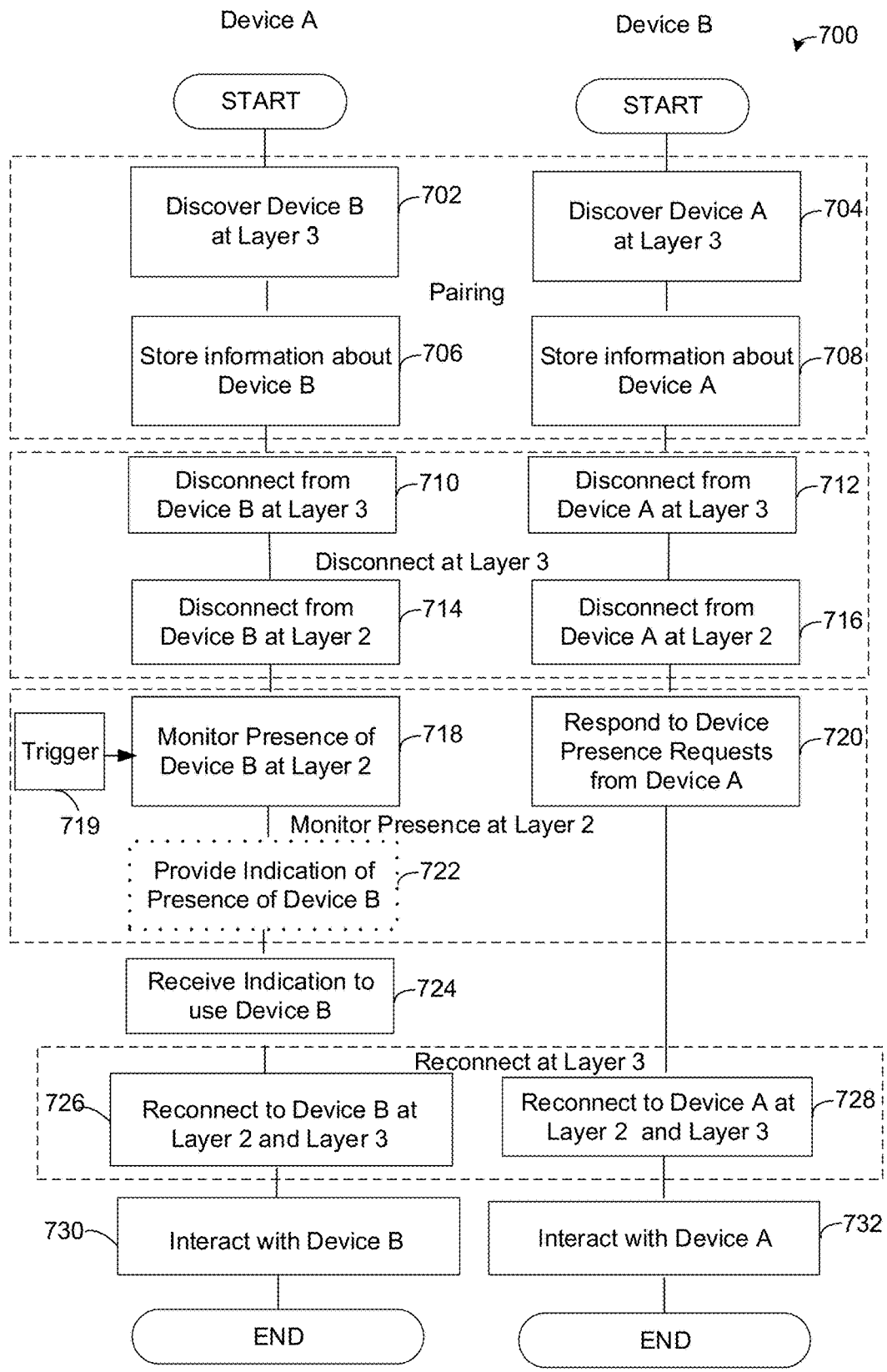
FIG. 7 is a flowchart of an exemplary method of operating exemplary devices A and B to monitor device presence in accordance with some embodiments.

FIG. 7 illustrates a process 700 of monitoring device presence at Layer 2 in accordance with some embodiments. Process 700 illustrates an example of operating devices indicated by way of example as "device A" and "device B." Thus, process 700 includes two processes executed by each of devices A and B.

In this instance, device A may be, for example, a computer (e.g., computer 102 or 202), whereas device B may be a remote device, such as a printer (e.g., printer 104 or 204) or other remote device engaging into a wireless connection with the computer. Though, it should be appreciated that any suitable types of devices having short-range communication capability may be substituted, as embodiments of the invention are not limited in this respect. The wireless connection between devices A and B may be established via an access point or it may be a wireless peer-to-peer connection.

Further, it should be appreciated that process 700 is described for an embodiment in which device A monitors presence of device B when device B is not actively used by way of example only. In some scenarios, both devices A and B may monitor each other's presence at Layer 2 in accordance with the techniques described herein. It should also be appreciated that devices A and B may engage in communications with other devices and may monitor these other devices' presence as well.

Process 700 may start at any suitable time. In some scenarios, process 700 may start when devices A and B appear in the vicinity of an access point to a network. For example, the devices may be in the environment as shown in connection with FIG. 1A. In some embodiments, process 700 may begin when devices A and B are within the reach of each other and may establish a direct wireless connection, such as in the example shown in FIG. 2A.

Regardless of a way in which process 700 initiates, devices A and B may first connect at Layer 2. The Layer 2 connection between the devices may be a WI-FI connection via an access point, or a direct connection in accordance with a WI-FI DIRECT™, BLUETOOTH® or other suitable short-range communication protocol. Devices A and B may then establish a Layer 3 connection over the underlying Layer 2 connection, and discover each other's capabilities at Layer 3.

Accordingly, device A may discover device B at Layer 3, as shown at block 702. Similarly, as shown at block 704, device B may discover device A at Layer 3. The Layer 3 connection may be an IP connection, though embodiments of the invention are not limited in this respect. The device discovery at Layer 3 may be performed using a suitable IP-based discovery protocol.

Next, information obtained in conjunction with establishing the Layer 3 connection between devices A and B may be stored. Thus, device A may store, at block 706, information about capabilities of device B. Device B, in turn, may store information about Device A, at block 708. Storing this information may avoid the need to conduct the device discovery again, when use of device B is desired.

When it is determined that device B is not in use and the Layer 3 connection to device B is therefore not actively used (though the Layer 3 connection may be in use to monitor presence of device B), device B may suspend communications at Layer 3. Suspending the Layer 3 communications may involve disconnecting device B at Layer 3, which is shown at block 710 where device A disconnects at Layer 3 from device B and at block 712 where device B disconnects at Layer 3 from device A. It should be appreciated that disconnecting device B at Layer 3 may involve terminating a Layer 3 connection via an access point or terminating a direct Layer 3 connection to device B (e.g., a WI-FI DIRECT™ connection).

In some embodiments, when the Layer 3 connection to device B is established at block 702, a timer may be initiated to track a lifetime of the Layer 3 connection. After the Layer 3 connection has been maintained for a period of time that has exceeded a certain time limit and if the connection is not actively used, the Layer 3 connection may be terminated, at block 712 and, consequently, at block 710.

Disconnecting device B at Layer 3 makes it unnecessary to maintain the Layer 2 connection to that device. Accordingly, devices A and B can disconnect from each other at Layer 2, as shown at blocks 714 and 716. It should be appreciated that operations at blocks 714 and 716 are shown to follow operations at blocks 710 and 712 by way of example only as the Layer 2 connection to device B may be terminated prior to terminating the Layer 3 connection to device B. Furthermore, in some scenarios, the Layer 3 and Layer 2 connections to device B may be terminated at the same time.

While device B suspends its communications at Layer 3 and the Layer 3 and Layer 2 connections between devices A and B are therefore terminated, presence of device B may be monitored by device A at block 718. Device A may monitor presence of device B using a suitable Layer 2 device discovery mechanism. In the example illustrated, device B, if available, may respond to probe requests of device A, at block 720. Though, device presence monitoring in accordance with a Layer 2 device discovery mechanism may be performed in any other suitable manner. In some embodiments, the monitoring may be performed upon a suitable trigger which may be provided at block 719.

In some embodiments, an indication of presence of device B that depends on the monitoring at blocks 718 and 720 may be provided in a suitable manner through device A. For example, a representation of availability of device B may be provided on a user interface of Device A. For example, such representation may be displayed on list of available devices 402 of device manager interface 400 (FIG. 4A). Though, it should be appreciated that the indication of presence of device B may be provided in any suitable manner, as embodiments of the invention are not limited in this respect.

Next, an indication of an attempt to use device B may be received at Device A, at block 724. The indication may be received by selecting device B for use via a user interface, such as, for example, list of available devices 402 (FIG. 4A). As another example, an indication of an attempt to use functionality of device B may be received. It should be appreciated that the indication of an attempt to use device B may be received in any suitable manner, as embodiments of the invention are not limited in this respect.

In response to receiving the indication of an attempt to use device B at block 724, the Layer 3 connection to device B may be reestablished at blocks 726 and 728, based on the monitoring of presence of device B at Layer 2. The Layer 3 connection to device B may be reestablished over an underlying Layer 2 connection that is also reestablished to support the Layer 3 connection.

After device B reconnects to device A at Layer 3, devices A and B may interact so that device B may be used, as shown at blocks 730 and 732. For example, if devices A and B comprise a computer and a wireless remote printer, a user of the computer may instruct the printer to print a document. Process 700 may then end. It should be appreciated, however, that process 700 may be continuous. Accordingly, after the requested use of device B is completed (e.g., a document is printed if device B comprises a remote printer), process 700 may return to blocks 710 and 712 where device B may again disconnect at Layer 3. While the Layer 3 connection to device B is terminated, presence of device B may subsequently be again monitored as shown in FIG. 7.

In some embodiments, rather than continuously monitoring device presence at Layer 2, presence of a paired with remote device may be determined in response to a trigger event, such as an indication that use of the remote device is desired. An example of such a process 800 is illustrated with reference to FIG. 8 where an exemplary device A pairs with an exemplary device B that subsequently disconnects from device A at Layer 3. While device B is disconnected from device A at Layer 3, in response to an indication of an attempt to use device B, device A may determine presence of device B.

Process 800 may be performed in various environments where it may be more practical to determine presence of a remote device in response to a trigger event, rather than to continuously monitor presence of the remote device. For example, determining device presence in response to a trigger may be used in settings where a device, such as a computer, may interact with one or more media devices to transfer streaming data from the computer to the media devices. As another example, the computer may access file sharing services provided by the remote device. Though, it should be appreciated that any suitable type of interaction with the remote device may be performed in response to a trigger, as embodiments of the invention are not limited in this respect.

Furthermore, determining device presence in response to a trigger may be practical in settings where users of different devices desire to use an application (e.g., a computer game) that may be concurrently executed on both devices and may be accessed by each user via the user's device. If an indication of using the shared application is received from a user of one of such devices, this device may initiate determination of presence of another device, using a Layer 2 device discovery mechanism in accordance with some embodiments. Also, both of the devices executing the application may determine each other's presence.

Referring back to FIG. 8, processing at blocks 802-816 may be performed similar to processing at blocks 702-716 described in conjunction with FIG. 7. The processing at blocks 802-816 is therefore not described herein for the sake of brevity. However, in the example illustrated, presence of device B is not monitored continuously. Accordingly, at block 818, an indication of an attempt to use device B may be received in a suitable manner. For example, device B may be selected from a list of installed devices (e.g., list of installed devices 402 in FIG. 4A). Alternatively or additionally, suitable user input may be received by device A indicating an attempt to execute an application that accesses device B. As another example, the indication may comprise powering up device B or other action indicating an attempt to use device B. Though, embodiments of the invention are not limited to a particular way in which an indication of an attempt to use device B may be received at device A, and this indication may be received in any suitable manner.

Regardless of a way in which the indication of an attempt to use device B is received at block 818, in response to the indication, device A may determine presence of device B. The determination may be done using a Layer 2 device discovery mechanism, in accordance with some embodiments of the invention. For example, device A may send a request to device B, in which case device B, if present, may respond to the request, as shown at block 822, by sending to device A a suitable response notifying device A of its presence. It should be appreciated that any suitable type of mechanism at Layer 2 may be used by device A to determine presence of device B in response to an indication of use of device B, as embodiments of the invention are not limited in this respect.

Next, process 800 may branch at decision block 824 depending on whether it is determined that device B is present. If it is determined that device B is present, process 800 may proceed to block 826 where an indication that depends on presence of device B may be provided through device A. The indication may comprise adding a representation of device B to a list of devices currently available for use to a user of device A. Though, any other suitable indication of presence of device B may be provided by device A, which is not limited to visually displaying a representation of device B on a user interface of device A.

Alternatively, if presence of device B is not determined in response to an attempt of its use, a suitable alternative action may be performed, at block 836. The alternative action may comprise suggesting to the user, in a suitable way, another device to use instead of device B. Alternatively or additionally, one or more notifications may be provided to the user informing the user that device B is not available and what other devices, if any, are available to be used instead of device B in the same or similar manner. It should be appreciated that any suitable type of an alternative action may be taken, as embodiments of the invention are not limited in this respect.

After presence of device B is determined, the Layer 3 connection to device B may be reestablished at blocks 828 and 830, based on the determining of presence of device B at Layer 2. The Layer 3 connection to device B may be reestablished over an underlying Layer 2 connection that is also reestablished to support the Layer 3 connection. Reconnecting device B at Layer 2 may involve, in embodiments where devices A and B are connected through the same access point, reconnecting device B to the access point (e.g., using a WI-FI protocol). In embodiments where devices A and B are directly connected to each other, a WI-FI DIRECT™ or BLUETOOTH® connection to device B may be formed.

After device B reconnects to device A at Layer 3, device B may be used in accordance with its functionality, as shown at blocks 832 and 834. Process 800 may then end. Though, it should be appreciated that, after device B has been used in a requested manner, process 800 may return to blocks 810 and 812 where devices A and B can disconnect from each other at Layer 3 and remain disconnected until an indication of use of device B is received. Accordingly, any time that device B is not actively used by device A, no active Layer 3 connection, such as an IP connection, may be maintained between the devices.

In some embodiments, the Layer 3 connection to device B may be reestablished for a certain period of time that may be specified in association with an event triggering the reestablishment of the connection. In such embodiments, process 800 may return to blocks 810 and 812 once the Layer 3 connection terminates upon the expiration of the period of time.

Figure 8:
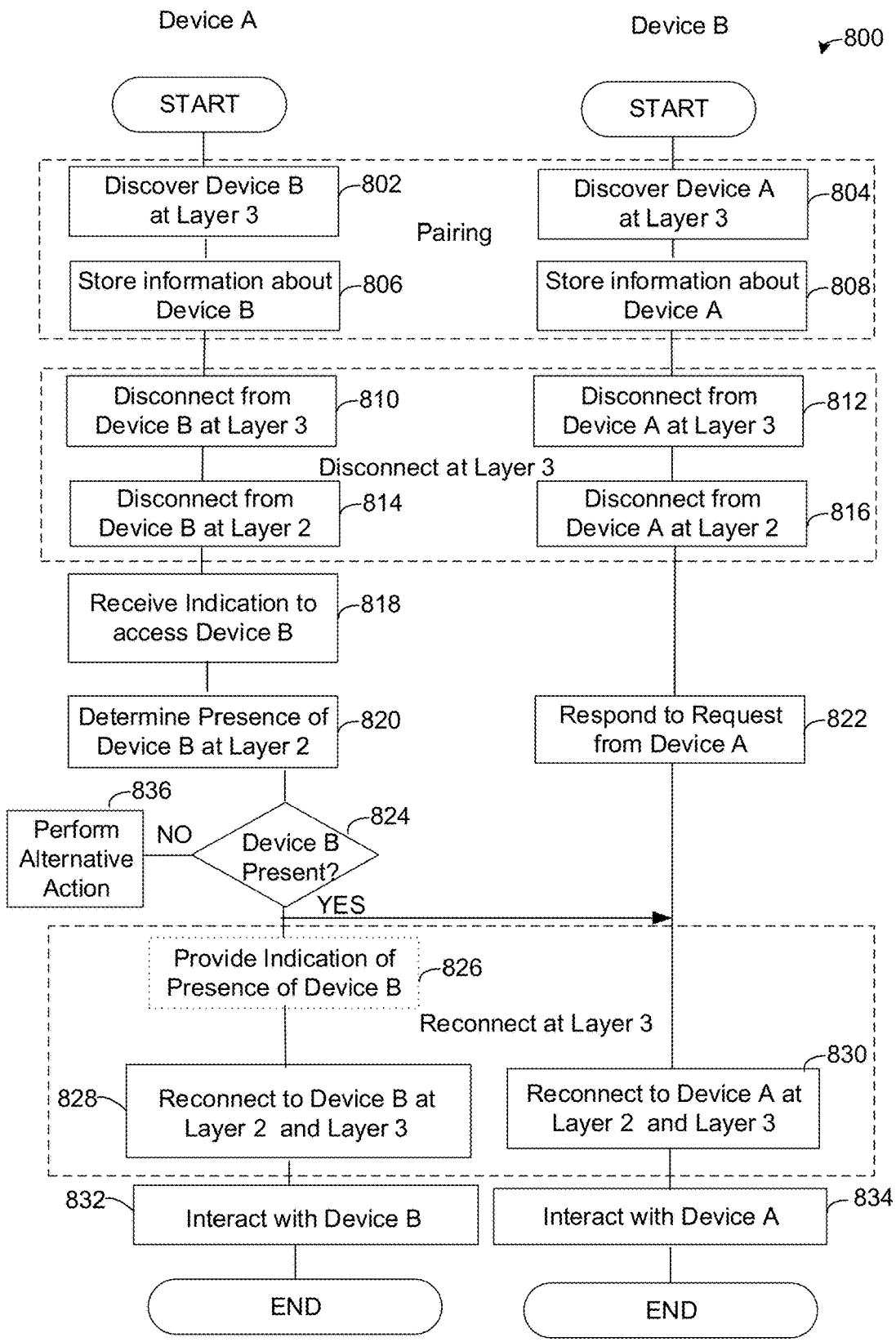
FIG. 8 is a flowchart of another exemplary method of operating exemplary devices A and B to determine device presence in accordance with some embodiments.

Regardless of whether device presence is determined at Layer 2 as described in connection with FIG. 7 or FIG. 8, eliminating the need to keep the IP connection to device B alive while device B is not actively used may reduce power consumption by both devices A and B. Moreover, an overhead that would otherwise be associated with sending messages to maintain a Layer 3 connection may be avoided. This may lead to a more cost-efficient use of the devices because the devices may be operated using battery as a power source for an extended period of time.

FIG. 9 illustrates an exemplary environment in which device presence may be monitored in accordance with some embodiments. The environment comprises a computer 902 shown by way of example as a laptop computer that may connect to a remote device, such as a TV 904, to stream data (e.g., audio and/or video data) to TV 904. A user 905 may control computer 902 using any suitable mechanism.

Figure 9A:
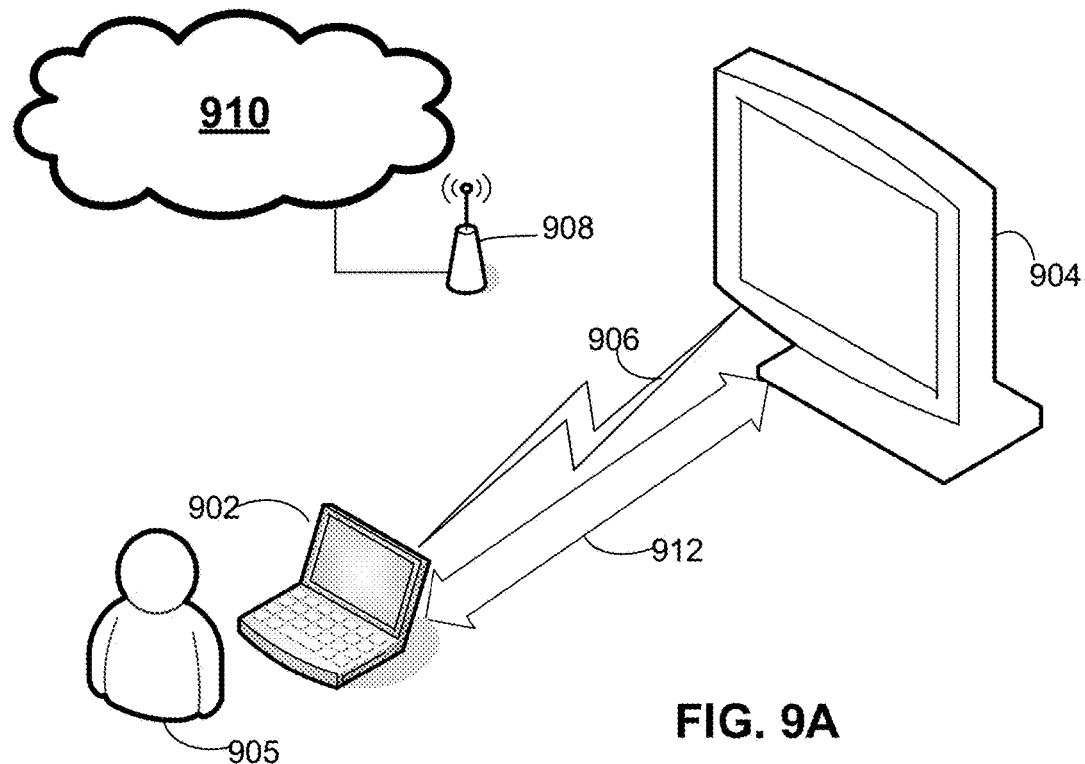
FIG. 9A shows Layer 2 and Layer 3 connections.

As shown in FIG. 9A, laptop 902 and TV 904 may pair and connect via a direct Layer 2 connection 906, such as a WI-FI DIRECT™ connection. Connection 906 may be not dependent on an access point 908 of a network 910. A Layer 3 connection 912 which may be, for example, an IP connection, may be established to TV 904 over Layer 2 connection 906 to learn about functionality provided by the device.

Figure 9B:
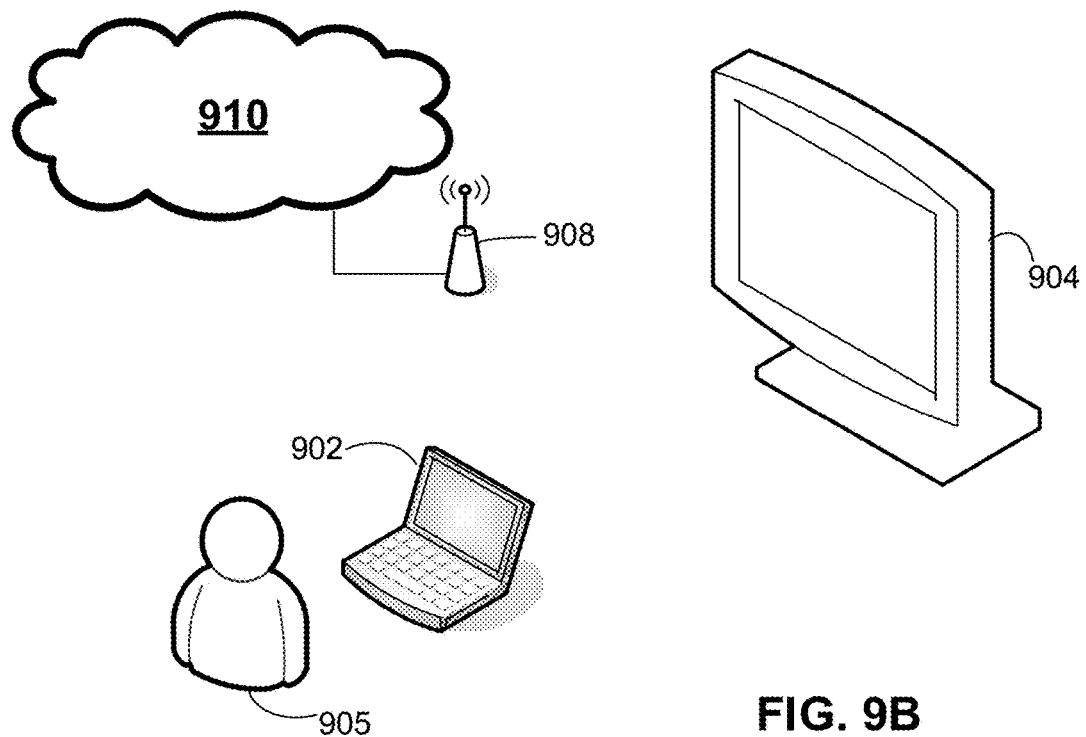
FIG. 9B shows termination of a Layer 3 connection.
Figure 9C:
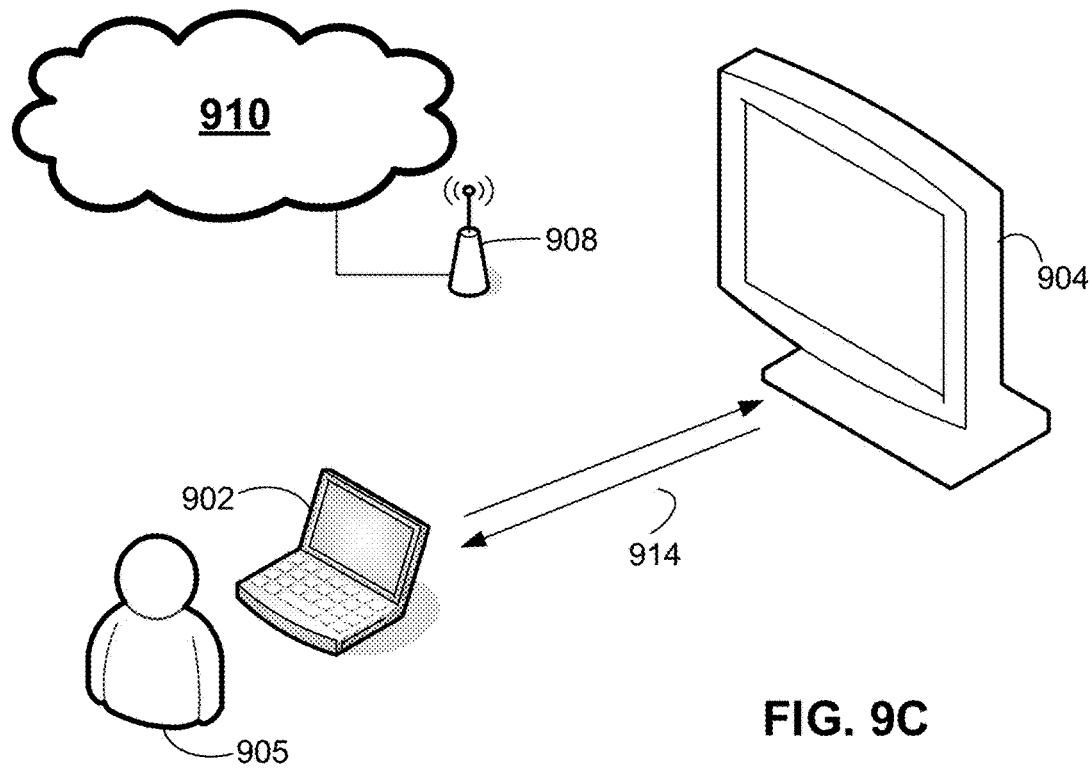
FIG. 9C shows use of a discovery mechanism.

FIG. 9B illustrates that, if Layer 3 connection 912 to TV 904 is not actively used to access services provided by TV 904, connection 912 may be terminated. Terminating Layer 3 connection 912 may involve terminating supporting Layer 2 connection 906 which avoids expending power that would otherwise be required to maintain the infrastructure of the Layer 2 connection. Power may be further saved because an overhead that would otherwise be required to maintain the Layer 3 connection may be avoided.

While Layer 3 connection 912 to TV 904 is terminated, presence of TV 904 may be monitored using a Layer 2 device discovery mechanism 914, in accordance with some embodiments. Accordingly, computer 902 and TV 904 may interact so that computer 902 is notified of presence of TV 904 which indicates availability of TV 904.

Figure 9D:
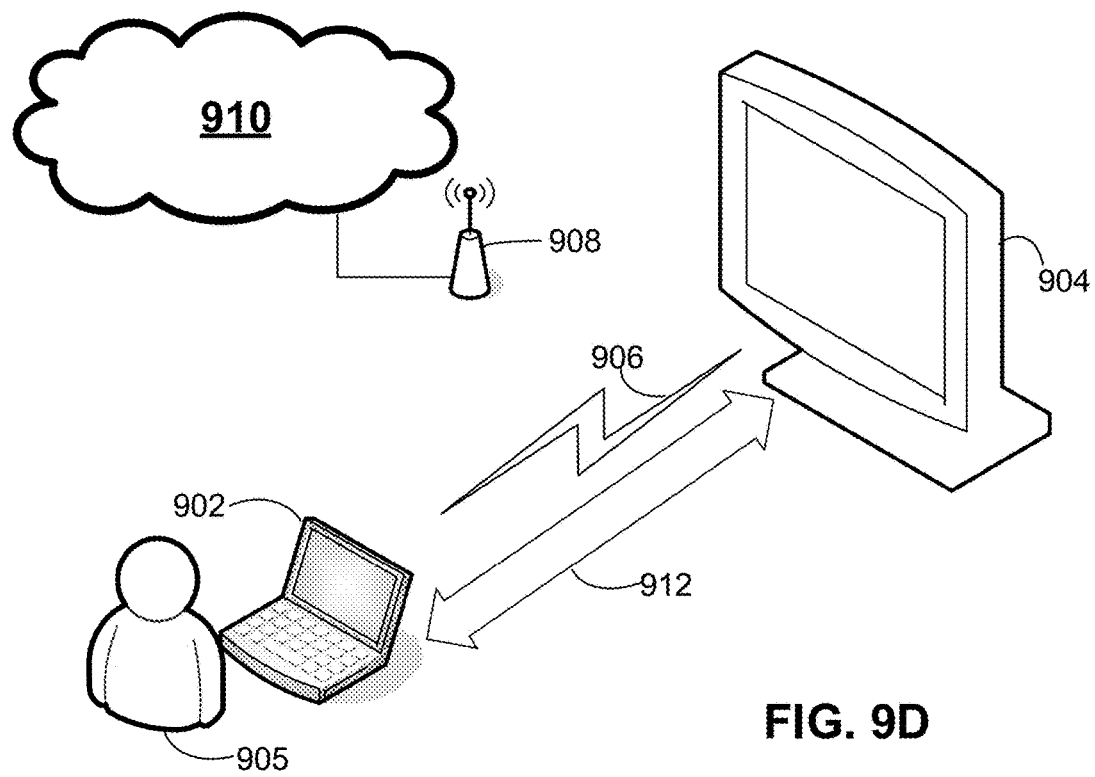
FIG. 9D shows formation of a Layer 3 connection.
Figure 9E:
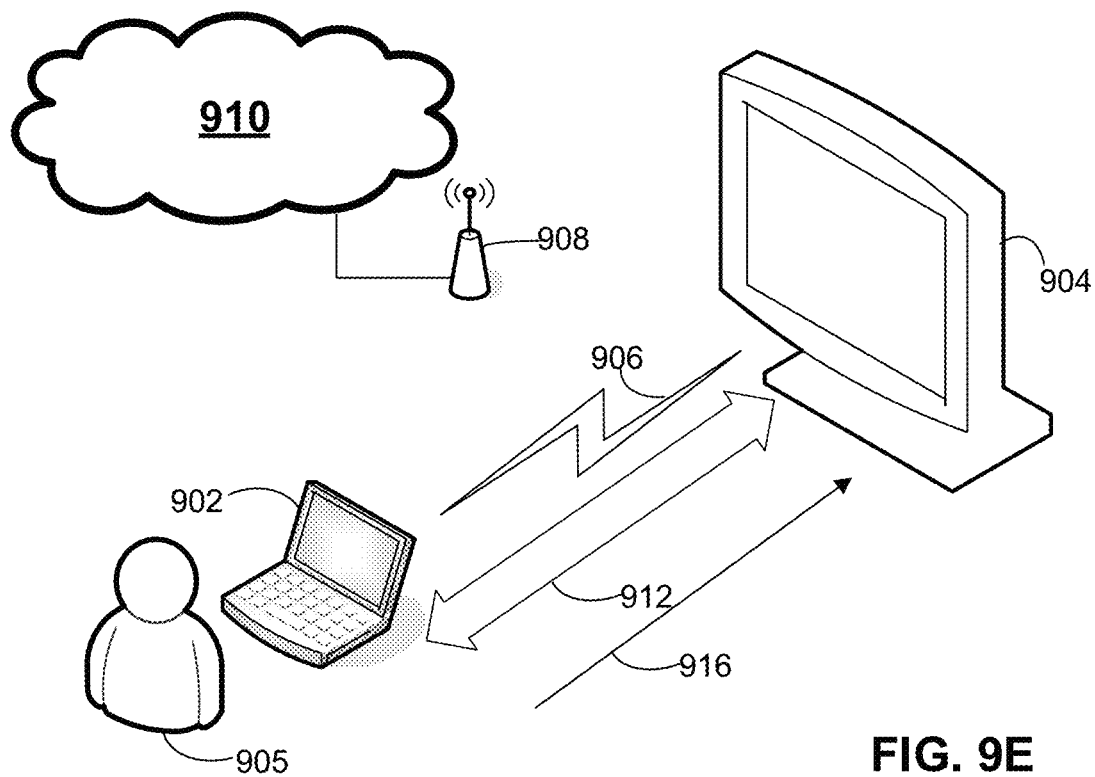
FIG. 9E shows streaming of data using a Layer 3 connection.

When an indication of use of TV 904 is received (e.g., user input received through computer 902), Layer 2 connection 906 to TV 904 may be reestablished and, as a result, Layer 3 connection 912 to TV 904 may be reestablished as well, as shown in FIG. 9D. Once connection 912 to TV 904 is reestablished, laptop 902 and TV 904 may interact. In this example, laptop 902 may stream data to TV 904, as schematically shown by an arrow 916 in FIG. 9E. Though, it should be appreciated that embodiments of the invention are not limited to a purpose and manner in which devices that may detect device presence using a Layer 2 device discovery mechanism interact.

Figure 10:
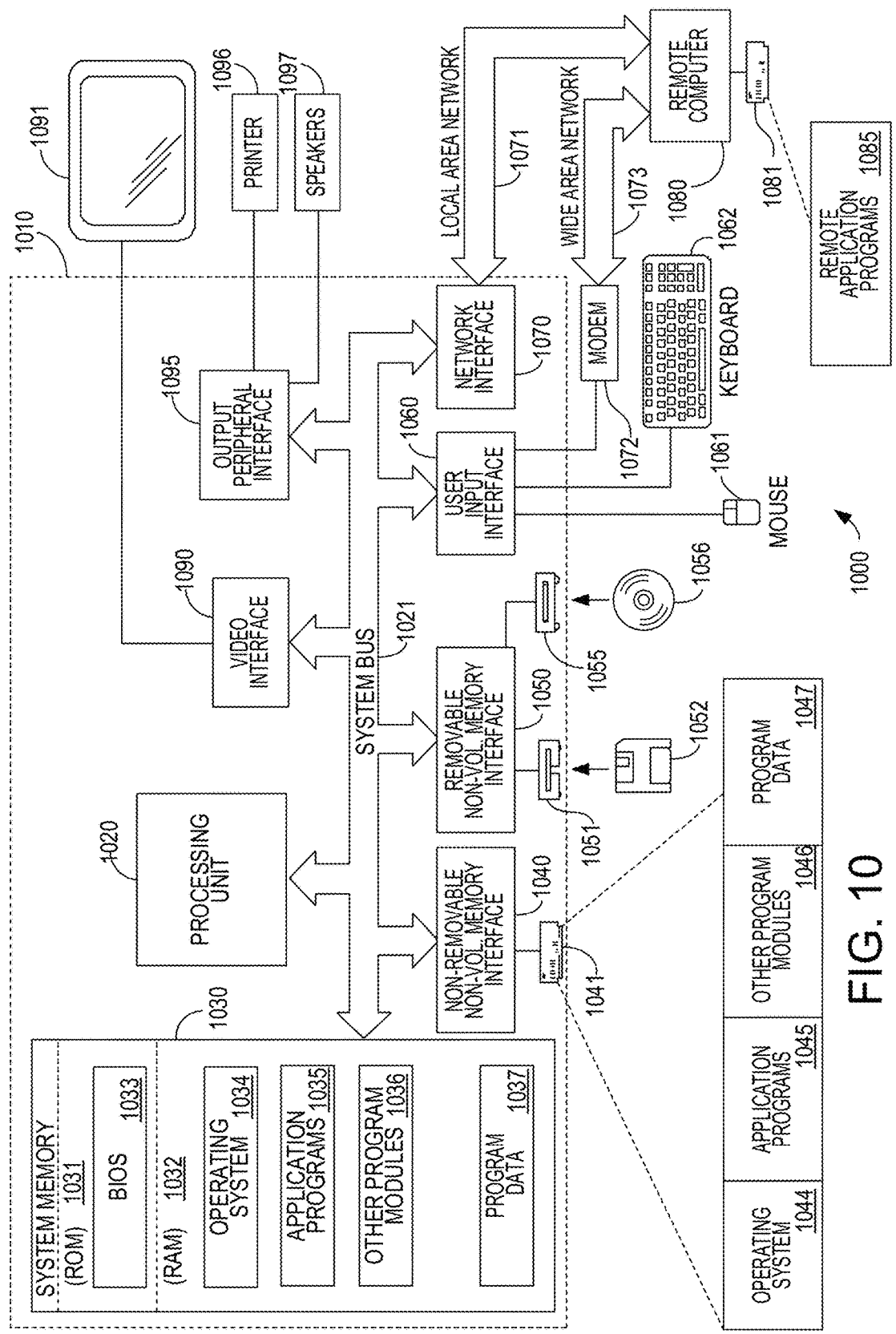
FIG. 10 is a functional block diagram of an illustrative computing device in which embodiments of the invention may be implemented.

FIG. 10 illustrates an example of a suitable computing system environment 1000 on which some embodiments of the invention may be implemented. It should be appreciated that the computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

Some embodiments of the invention are operational with numerous other general purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. Some embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing some embodiments of the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through an non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

In exemplary embodiments described above, a connection for establishing a service using a Layer 3 was reestablished based on determining the presence of a device using a discovery mechanism incorporated as part of a Layer 2 protocol. Though, in other embodiments, a computing device may support different Layer 3 protocols. A connection formed using one Layer 3 protocol may be suspended and reestablished based on device discovery information generated with a second Layer 3 protocol. Such an embodiment may be useful, for example, in scenarios in which different Layer 3 protocols have different discovery mechanisms that impact battery drain or performance of a computing device differently.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of a first device accessing functionality on a second device, the method comprising:
    monitoring for presence of the second device using a layer-2 discovery mechanism without forming a layer-3 connection between the first device and the second device;
    based on the monitoring, establishing a layer-3 connection with the second device;
    transmitting information related to the functionality of the second device over a layer-3 connection to the second device;
    receiving from the second device a response to the layer-3 discovery protocol message; and
    based on information in the response, accessing the functionality of the second device over a layer-3 network.

2. The method of claim 1, further comprising: transmitting to the second device a request to access the functionality of the second device based on an attempt to use the functionality of the second device.

3. The method of claim 1, further comprising maintaining state information indicating whether the second device has been determined by the monitoring to be present, wherein when the monitoring determines that the second device is present the state information is updated accordingly, and when the monitoring determines that the second device is not present the state information is updated accordingly.

4. The method of claim 1, wherein during the monitoring using the layer-2 discovery mechanism there is no layer-2 connection between the first device and the second device.

5. The method of claim 1, wherein the layer-3 connection is established over a layer-2 connection, and wherein the layer-2 connection and the layer-2 discovery mechanism both conform to a same layer-2 protocol.

6. The method of claim 5, wherein the layer-3 connection comprises an Internet Protocol (IP) connection, and the layer-2 protocol comprises a wireless protocol.

7. The method of claim 1, further comprising receiving an indication caused by an application executing on the first computing device, and in response forming a layer-2 connection for the layer-3 connection.

8. A method of a first computing device accessing application-level functionality executing on a second computing device, the method performed by the first computing device and comprising:
    monitoring for presence of the second computing device using a wireless link-level advertisement, the monitoring performed while there is no network-level connection between the first computing device and the second computing device;

based on the monitoring detecting the second computing device, establishing a network-level connection between the first computing device and the second computing device;

transmitting a message comprising information indicating the application-level functionality of the second computing device over the network-level connection, the message received by the second computing device;

receiving from the second computing device a response to the message, the response comprising information identifying the application-level functionality or a link to information about the application-level functionality; and based on the information in the response, accessing the application-level functionality on the second computing device over the network-level connection.

9. The method of claim 8, wherein the monitoring for presence of the second computing device using the wireless link-level advertisement is performed based on a request by application-level instructions executing on the first computing device.

10. The method of claim 9, wherein the monitoring for presence of the second computing device using the wireless link-level advertisement continues to be performed after determining that the second computing device is present and at least until the application-level instructions initiate transmitting the message.

11. The method of claim 8, further comprising, in accordance with the monitoring, providing an indication of presence of the second computing device to application-level software on the first device, the application-level software, the application-level software configured to interoperate with the application-level functionality at the application level.

12. The method of claim 11, further comprising initiating, based on the indication of presence, by the application-level software, the transmitting of the message.

13. The method of claim 8, wherein the message comprises a universal Plug and Play(uPnP) message.

14. The method of claim 8, wherein application code executing on the first computing device uses the information from the response to access the application-level functionality executing on the second computing device.

15. A computing device comprising:
  a layer-2 protocol module configured to monitor for a second device using a layer-2 discovery mechanism without forming a layer-3 connection with between the first device and the second device, the layer-2 discovery mechanism implemented by the layer-2 protocol module and comprising layer-2 advertisements configured to be transmitted without requiring existence or formation of a pairing or connection according to the layer-2 protocol;
  a layer-3 protocol module configured to, based on the monitoring, establish and manage a layer-3 connection with the second device;
  storage hardware storing instructions configured to cause processing hardware of the computing device to cause a message to be transmitted to the second device, the message comprising information related to functionality of the second device;
  the layer-3 protocol module further configured to receive, from the second computing device, a response to the message; and
  the instructions further configured to, based on information in the response, access the functionality of the second device over the layer-3 connection.

16. A computing device according to claim 15, wherein a layer-2 advertisement comprises a uniform resource locator (URL).

17. A computing device according to claim 15, wherein the computing device comprises a first wireless interface configured to transmit the layer-2 advertisements.

18. A computing device according to claim 17, further configured to exchange layer-3 packets of the layer-3 connection with the second device without using a layer-2 connection of the layer-2 protocol module.

19. A computing device according to claim 15, wherein the message comprises a multicast packet.

20. A computing device according to claim 15, wherein the message comprises a uPnP request.

* * * * *